US008460452B2

(12) United States Patent
Yagi et al.

(10) Patent No.: US 8,460,452 B2
(45) **Date of Patent: *Jun. 11, 2013**

(54) OXIDE MATERIAL, ELECTROPHOTOGRAPHIC PHOTORECEPTOR, PROCESS CARTRIDGE, AND IMAGE FORMING DEVICE

(75) Inventors: Shigeru Yagi, Kanagawa (JP); Takeshi Iwanaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 316 days.

This patent is subject to a terminal disclaimer.

(21) Appl. No.: 12/767,321

(22) Filed: Apr. 26, 2010

(65) Prior Publication Data

US 2011/0070536 A1 Mar. 24, 2011

(30) Foreign Application Priority Data

Sep. 24, 2009 (JP) ................................ 2009-219445
Sep. 25, 2009 (JP) ................................ 2009-220826

(51) Int. Cl.
*C09D 1/00* (2006.01)
*G03G 15/04* (2006.01)

(52) U.S. Cl.
USPC ............... 106/286.6; 430/56; 430/60; 430/66

(58) Field of Classification Search
USPC .............................. 430/56, 60, 66; 106/286.6
See application file for complete search history.

(56) References Cited

U.S. PATENT DOCUMENTS

| | | | | |
|---|---|---|---|---|
| 2008/0070138 | A1* | 3/2008 | Yagi et al. | 430/66 |
| 2008/0254379 | A1* | 10/2008 | Iwanaga et al. | 430/66 |
| 2010/0330481 | A1* | 12/2010 | Yagi | 430/66 |

FOREIGN PATENT DOCUMENTS

| | | |
|---|---|---|
| JP | A-1-279255 | 11/1989 |
| JP | 2-110470 | 4/1990 |
| JP | A-11-186571 | 7/1999 |
| JP | A-2003-27238 | 1/2003 |
| JP | A-2003-29437 | 1/2003 |
| JP | A-2003-316053 | 11/2003 |
| JP | A-2006-267507 | 10/2006 |
| JP | A-2008-76520 | 4/2008 |

OTHER PUBLICATIONS

Jun. 14, 2012 Office Action issued in U.S. Appl. No. 12/637,429.
Jan. 10, 2013 Office Action issued in U.S. Appl. No. 12/637,429.

* cited by examiner

*Primary Examiner* — Stewart Fraser
(74) *Attorney, Agent, or Firm* — Oliff & Berridge, PLC

(57) ABSTRACT

An oxide material including gallium, zinc and oxygen, a ratio of the number of atoms of zinc to the number of atoms of gallium (number of atoms of zinc/number of atoms of gallium) being from about 0.01 to about 0.6 and a ratio of the number of atoms of oxygen to the sum of the number of atoms of gallium and the number of atoms of zinc (number of atoms of oxygen/(number of atoms of gallium+number of atoms of zinc)) being from about 1.0 to about 1.6, is disclosed. An electrophotographic photoreceptor including a layer which includes the oxide material is also disclosed. An electrophotographic photoreceptor including a substrate; and a photosensitive layer including gallium, oxygen and zinc is also disclosed.

7 Claims, 8 Drawing Sheets

OXIDE MATERIAL, ELECTROPHOTOGRAPHIC PHOTORECEPTOR, PROCESS CARTRIDGE, AND IMAGE FORMING DEVICE

CROSS-REFERENCE TO RELATED APPLICATIONS

This application is based on and claims priority under 35 USC 119 from Japanese Patent Application No. 2009-220826 filed on Sep. 25, 2009, and Japanese Patent Application No. 2009-219445 filed on Sep. 24, 2009.

BACKGROUND

1. Technical Field

The present invention relates to oxide materials, electrophotographic photoreceptors, process cartridges, and image forming devices.

2. Related Art

In recent years, electrophotographic methods have been widely developed as techniques for copying machines or printers. In electrophotographic methods, electrophotographic photoreceptors (may also be referred to as "photoreceptors") are used.

SUMMARY

According to an aspect of the present invention, an oxide material comprising gallium, zinc and oxygen, a ratio of the number of atoms of zinc to the number of atoms of gallium (number of atoms of zinc/number of atoms of gallium) being from about 0.01 to about 0.6 and a ratio of the number of atoms of oxygen to the sum of the number of atoms of gallium and the number of atoms of zinc (number of atoms of oxygen/(number of atoms of gallium+number of atoms of zinc)) being from about 1.0 to about 1.6, is provided.

DETAILED DESCRIPTION

Figure 1:
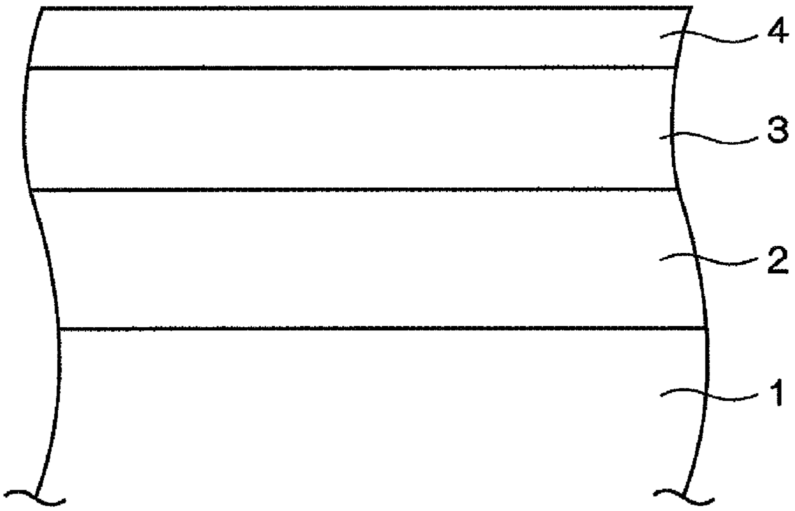
FIG. 1 is a schematic view illustrating an example of a layer structure of an electrophotographic photoreceptor according to an exemplary embodiment of the present invention.

Hereinafter, exemplary embodiments of the invention are described with reference to the attached drawings. In each drawing, the same or equivalent portions are designated by the same reference numerals, and the duplicated descriptions are omitted as appropriate.

I. Exemplary Embodiment A

When the surface of an electrophotographic photoreceptor is hard amorphous silicon, for example, image blurring or image degradation due to adhesion of discharge products or the like often occurs particularly at a high humidity. Therefore, carbon films are often used as a surface layer. However, the carbon films, such as hydrogenated amorphous carbon films (a-C:H) or fluorinated a-C:H, F, become colored films when satisfactorily hardened. Therefore, the light transmission becomes high and the sensitivity increases as the surface is abraded. When the abrasion unevenly occurs, the sensitivity also becomes uneven, which may result in image unevenness, in particular, in a half tone.

Although a hydrogenated amorphous silicon carbide film (a-SiC:H) is sometimes used for electrophotographic photoreceptors as a film satisfying transparency and hardness, image blurring or image degradation is also likely to occur due to adhesion of discharge products.

Other than the electrophotographic photoreceptors containing a silicon hard material, the same applies to the surface layer of organic electrophotographic photoreceptors having an organic photosensitive layer. The relationship between hardness and the degree of abrasion may also lead to the adhesion of discharge products and difficulty of removing the same. Therefore, as materials used for the surface layer, materials which have durability, which are hardly deteriorated, to which deposits are unlikely to adhere, and which are easy to remove are preferable.

In particular, when a high molecular weight compound having a siloxane bond is used to form a surface layer, which is a hard surface layer formed by coating, for example, the abrasion resistance may be improved, but the hardness may be low, scratches or adhesion when abraded increases, and the life of photoreceptors may become short due to adhesion of toner components.

In contrast, with respect to carbon thin film materials, research and development of diamond like carbons or diamond films have been widely performed for the purpose of the application making use of various characteristics thereof, such as abrasion resistant materials, low friction materials, gas barrier materials, or electron-emitting materials, as well as semiconductor materials.

In order to obtain a sufficiently hard film, diamond-type sp3 bonding properties may be increased. However, mixing of sp2 bonding of graphite may inevitably occur, and thus the film may be colored black, which may result in the fact that a transparent film is not obtained. In order to try to obtain a transparent film, an organic soft film may be formed.

In recent years, research and development of nitride carbon films are also performed. However, the hardness or properties higher than those of diamond films or diamond like carbon films have not yet been achieved.

In order to obtain films having higher hardness and density, heat treatment at a temperature as high as 1000° C. or the charge of high discharge electric power is required. Thus, the application to polymer films or the like are limited.

The present inventors have studied oxide semiconductor materials of Group XIII so as to achieve a hard and transparent surface layer of electrophotographic photoreceptors. As a result, the present inventors have found that, when using an oxide material containing gallium, zinc, and oxygen and having a specific atomic composition ratio, both abrasion resistance and light transmittance may be achieved and that image deterioration due to high humidity or discharge products may be suppressed by using the oxide material in the surface layer of electrophotographic photoreceptors. Furthermore, the present inventors have also found that the oxide materials are useful not only for the surface layer of electrophotographic photoreceptors but for an undercoat layer, a charge transport layer, or materials used in other electron devices having high hardness and light transmittance and requiring an electrical conductivity of, for example, from $1\times10^5$ Ωcm to $1\times10^3$ Ωcm.

<Oxide Material>

The oxide materials according to an exemplary embodiment of the present invention (exemplary embodiment A) at least contains gallium, zinc, and oxygen, and the ratio of the number of atoms of the zinc to the number of atoms of the gallium (number of atoms of zinc/number of atoms of gallium) is from 0.01 (or about 0.01) to 0.6 (or about 0.6), and the ratio of the number of atoms of the oxygen to the sum of the number of atoms of the gallium and the number of atoms of zinc (number of atoms of oxygen/(number of atoms of gallium+number of atoms of zinc)) is from 1.0 (or about 1.0) to 1.6 (or about 1.6) (hereinafter the oxide material containing gallium, zinc, and oxygen and having the composition ratio described above may be abbreviated as “GaZnO material” as appropriate).

In usual, when the content of zinc is higher in the oxide materials containing gallium, zinc, and oxygen, the oxide materials are likely to be colored, the light transmittance is likely to become low, the surface energy to water is likely to become high, and the chemical stability is likely to become low. In contrast, when the content of zinc is excessively low in the oxide materials containing gallium, zinc, and oxygen, the resistance may increase. Gallium has high stability to water, but when the content thereof relative to oxygen is excessively high, the light transmittance may become low.

In contrast, when the GaZnO material according to this exemplary embodiment has the atomic composition ratio described above, both abrasion resistance and light transmittance may be achieved, the chemical stability may be high, and the electrical conductivity may be from $1\times10^5$ Ωcm to $1\times10^3$ Ωcm, for example. The GaZnO material of this exemplary embodiment may be used for any application without particularly limitation when the GaZnO material is applied to any of the members requiring the properties described above. For example, the GaZnO material of this exemplary embodiment may be particularly useful as the surface layer of electrophotographic photoreceptors, for example.

<Electrophotographic Photoreceptor>

The electrophotographic photoreceptor of an exemplary embodiment (exemplary embodiment A) includes a layer which includes the oxide material of this exemplary embodiment (exemplary embodiment A). Hereinafter, the electrophotographic photoreceptor of this exemplary embodiment (exemplary embodiment A) is described in detail.

Figure 2:
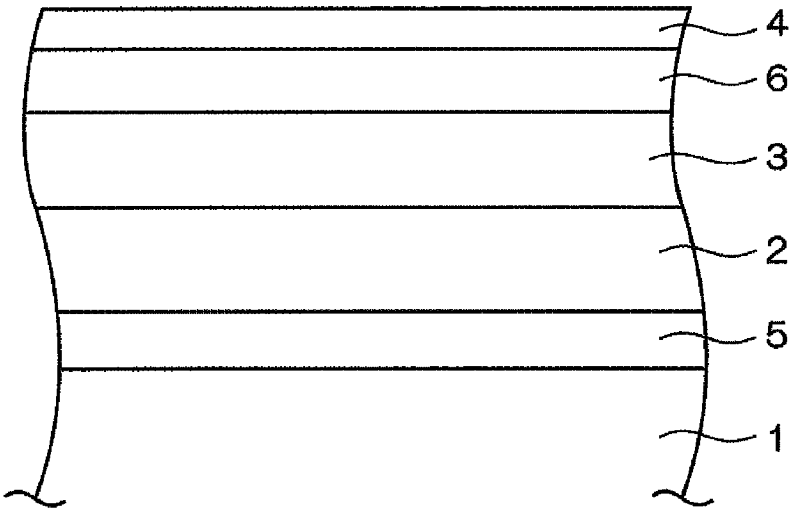
FIG. 2 is a schematic view illustrating an example of a layer structure of the electrophotographic photoreceptor according to an exemplary embodiment of the present invention.
Figure 3:
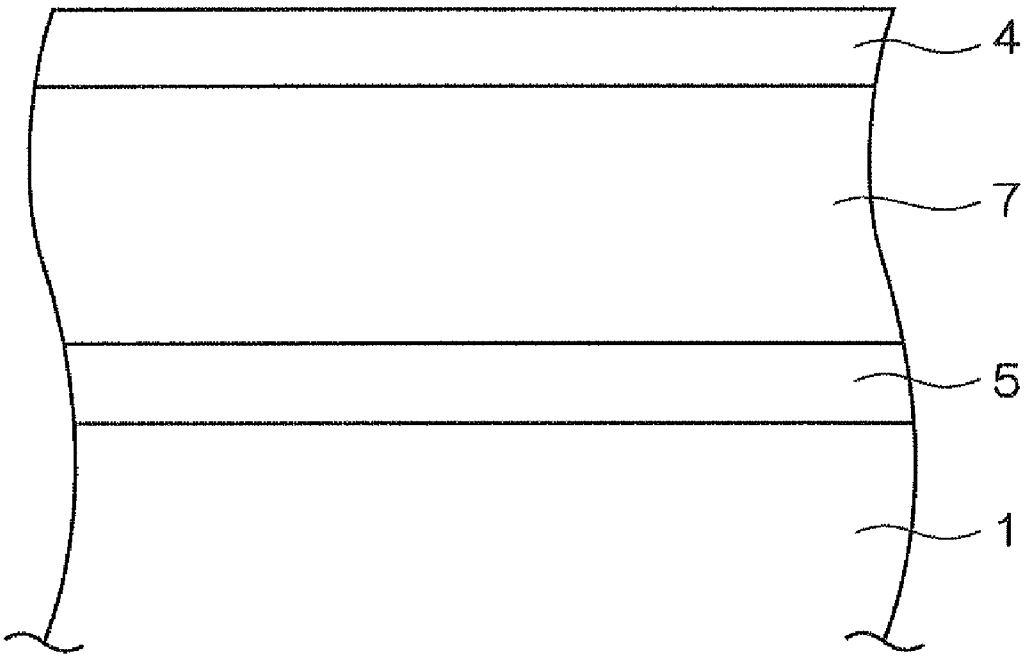
FIG. 3 is a schematic view illustrating an example of a layer structure of the electrophotographic photoreceptor according to an exemplary embodiment of the present invention.

FIGS. 1, 2, and 3 schematically illustrate examples of the layer structure of electrophotographic photoreceptors for each of which the GaZnO material of this exemplary embodiment is used.

In the electrophotographic photoreceptor illustrated in FIG. 1, a charge generating layer 2, a charge transport layer 3, and a surface layer 4 are disposed on a conductive support 1 in this order from the support 1 side. In the electrophotographic photoreceptor illustrated in FIG. 2, an undercoat layer (charge injection inhibition layer) 5, the charge generating layer 2, the charge transport layer 3, an intermediate layer 6, and the surface layer 4 are disposed on the conductive support 1 in this order from the support 1 side. In the electrophotographic photoreceptor illustrated in FIG. 3, the undercoat layer 5, a photosensitive layer 7 in which the charge transport layer and the charge generating layer are integrated, and the surface layer 4 are disposed on the conductive support 1 in this order from the support 1 side.

The oxide material according to this exemplary embodiment may be used for the layers other than charge generating layer 2 in the electrophotographic photoreceptors having these structures. Hereinafter, the case where the oxide material is used in the surface layer is described as a typical example.

When the oxide material is used in the surface layer, the charge generating layer 2, the charge transport layer 3, and the photosensitive layer 7 in which the charge generating layer and the charge transport layer are integrated each may contain organic polymers, may contain inorganic materials, or may contain both organic polymers and inorganic materials.

The organic polymer compounds used in the charge generating layer 2 and the charge transport layer 3 may be thermoplastic or thermosetting compounds or may be formed by reacting plural materials.

In the case of the organic polymer layer, an intermediate layer may be provided from the viewpoint of improvement of hardness, expansion coefficient, adhesiveness, etc., between the surface layer 4 and the organic polymer layer. The intermediate layer is preferably a layer showing intermediate physical properties between the surface layer 4 and the charge transport layer or the like. The intermediate layer may function as a layer for trapping charges.

In any structure, the surface layer 4 formed with the GaZnO materials according to this exemplary embodiment may have high transparency, high density, and high hardness. Thus, when the surface layer is provided, the development of flaws on the surface of the photoreceptors may be suppressed. Since the surface chemical stability is excellent and the surface energy is low, the adsorption of nitrogen oxides or the like is hard to occur. Since the GaZnO material of this exemplary embodiment is an oxide having a high oxygen concentration, the GaZnO material shows resistance to an oxidizing atmosphere by ozone or nitrogen oxides.

The surface layer 4 according to this exemplary embodiment may trap surface charges on the surface of the layer or may trap the same thereinside. The surface charges may be positively injected. When charges are injected into the surface layer 4, a structure in which charges are trapped at the interface with the photosensitive layer is required. When electrons are injected into the surface layer in a negatively charged state, the surface of a hole transport layer may function as charge trapping or a layer for inhibiting the injection of charges and for trapping charges may be provided. In the positively charged type, the same may apply.

Hereinafter, each component is more specifically described.

—Conductive Support—

The conductive support 1 supports a photosensitive layer or the like formed on the surface. In this description, the "conductive" of the conductive support refers to properties in which the volume resistivity is lower than $10^{13}$ Ωcm.

Examples of the conductive support 1 include metal drums of aluminum, copper, iron, stainless steel, zinc, nickel, or the like; substances in which metal(s), such as aluminum, copper, gold, silver, platinum, palladium, titanium, nickel-chromium, stainless steel, or copper-indium, is vapor-deposited on a substrate, such as a sheet, paper, plastics, or glass; substances in which a conductive metal compound(s), such as indium oxide or tin oxide, is vapor-deposited on the substrate mentioned above; substance in which metallic foil is laminated on the substrate mentioned above; substances in which carbon black, indium oxide, tin oxide-antimony oxide powder, metal powder, copper iodide, or the like is dispersed in a binder resin, and applied to the substrate mentioned above for conductive treatment.

The shape of the support 1 may be a cylindrical shape. When a metal pipe is used as the conductive support 1, the surface of the support 1 may be untreated but the surface of the support surface may be roughened beforehand by surface treatment. By the surface roughening treatment, woodgrain-like density unevenness due to interference light is suppressed which may generate in the photoreceptor when coherent light sources, such as a laser beam, are used as an exposure light source. Examples of methods for the surface treatment include mirror surface cutting, etching, anodic oxidation, rough cutting, centerless grinding, sandblasting, and wet honing.

In particular, it is preferable to use, as the conductive support 1, an aluminum support whose surface has been subjected to anodic oxidation treatment in terms of improvement of adhesiveness with a photosensitive layer and improvement of film formation properties.

Hereinafter, a method for producing the conductive support whose surface has been anodized is described.

First, pure aluminum or an aluminum alloy (e.g., aluminum or alloys of aluminum according to JIS H4080, No. 1000 series, 3000 series, or 6000 series) is prepared as the support (hereinafter also referred to as a "substrate"). The disclosure of JIS H4080 is incorporated by reference herein. Then, the support is anodized. The anodizing is carried out in an acid bath, such as a bath of chromic acid, sulfuric acid, oxalic acid, phosphoric acid, boric acid, or sulfamic acid, and treatment in a sulfuric acid bath is frequently used. The anodizing is carried out under the conditions of, for example, a sulfuric acid concentration of from 10% by weight to 20% by weight, a bath temperature of from 5° C. to 25° C., a current density of from 1 A/$dm^2$ to 4 A/$dm^2$, an electrolysis voltage of from 5 V to 30 V, and a treatment period of from approximately 5 minutes to 60 minutes, however the conditions are not limited thereto.

The anodized film thus formed on the aluminum substrate is porous and highly insulative, and the surface is very unstable. Therefore, the physical properties are likely to change with time after film formation. In order to prevent the changes in the physical properties, a process for sealing pores in the anodized film is further performed. Examples of the pore-sealing methods include a method for immersing the anodized film in an aqueous solution containing nickel fluoride or nickel acetate, a method for immersing the anodized film in boiling water, a method for treating the same with pressurized steam, and the like. Among these methods, the method for immersing the film in an aqueous solution containing nickel acetate is most frequently used.

On the surface of the pore-sealed anodized film, metal salts or the like adhering during pore sealing remain in an excessive amount. Then, the anodized film is washed after pore sealing for removal of the metal salts or the like adhering during pore sealing. In the process, the substrate may be washed with pure water once, but is preferably washed repeatedly in multiple washing processes. As a washing liquid to be used in the final washing process, a deionized washing liquid is used, for example. The substrate is more preferably physically washed with a contact material, such as a brush, in any one of the multiple washing processes.

The thickness of the anodized film thus formed on the conductive substrate surface is preferably in the range of from approximately 3 μm to 15 μm. A layer referred to as a barrier layer is present along the porous surface of the porous anodized film on the anodized film. The thickness of the barrier layer may be in the range of from 1 nm to 100 nm in the photoreceptor according to this exemplary embodiment. As described above, an anodized conductive substrate is obtained.

—Undercoat Layer—

Examples of materials used in the undercoat layer 5 include acetal resins, such as polyvinyl butyral; polymer resin compounds, such as a polyvinyl alcohol resin, casein, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin; and organic metal compounds containing zirconium, titanium, aluminum, manganese, silicon atoms, etc.

One kind of these compounds may be used singly or two or more kinds of these compounds may be used as a mixture or a polycondensate of two or more. Among the above, organic metal compounds containing zirconium or silicon are preferably used because the residual potential is low, changes in the electric potential due to environments are small, and changes in the electric potential due to repeated use are small. One kind of the organic metal compounds may be used singly or two or more kinds thereof may be used as a mixture. The organic metal compound(s) may be mixed with the binder resins mentioned above for use.

Examples of organic silane compounds (organic metal compounds containing a silicon atom) include vinyltrimethoxysilane, vinyltris(2-methoxyethoxy silane), γ-methacryloxpropyl trimethoxy silane, γ-metacryloxypropyl-tris (β-methoxyethoxy)silane, β-(3,4-epoxycyclohexyl) ethyltrimethoxysilane, γ-glycidoxypropyltrimetoxysilane, vinyltriacetoxysilane, γ-mercaptopropyltrimethoxysilane, γ-aminopropyltriethoxysilane, N-phenyl-γ-aminopropyltrimethoxysilane, N-β-(aminoethyl)-γ-aminopropyltrimethoxysilane, N-β-(aminoethyl)-γ-aminopropylmethyldimethoxysilane, N,N-bis(β-hydroxyethyl)-γ-aminopropyltriethoxysilane, and γ-chlorpropyltrimethoxysilane. Among the above, preferable examples include silane coupling agents, such as vinyltriethoxysilane, vinyltris(2-methoxyethoxy silane), γ-methacryloxpropyltrimethoxysilane, γ-glycidoxypropyltrimetoxysilane, β-(3,4-epoxycyclohexyl)ethyltrimethoxysilane, N-β-(aminoethyl)γ-aminopropyltrimethoxysilane, N-β-(aminoethyl)γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimetoxysilane.

Examples of the undercoat layer which may be used further include known undercoat layers, such as the undercoat layer described in Paragraphs 0113 to 0136 of JP-A No. 2008-076520.

—Charge Generating Layer—

The charge generating layer 2 may be an organic charge generating layer containing an organic charge generating material or an inorganic charge generating layer containing an inorganic charge generating material.

Here, the "organic charge generating layer" refers to one in which organic charge generating material(s) is dispersed in an organic polymer compound film, one which has been cross-linked after application, or one in which the organic charge generating material(s) is film coated without using a binder resin by a plasma CVD method, a vacuum evaporation method, etc. In contrast, the "inorganic charge generating layer" refers to a layer not containing a carbon chain.

The charge generating layer is formed by vapor-depositing a charge generating material(s) by a vacuum deposition method or applying a solution containing an organic solvent and a binder resin.

Examples of the inorganic charge generating materials include amorphous selenium, crystalline selenium, a selenium-tellurium alloy, a selenium-arsenic alloy, other selenium compounds; inorganic photoconductors, such as a selenium alloy, a zinc oxide, or a titanium oxide; dye-sensitized materials thereof.

Examples of the organic charge generating materials include various phthalocyanine compounds, such as non-metal phthalocyanine, titanylphthalocyanine, copper phthalocyanine, tin phthalocyanine, or gallium phthalocyanine; various organic pigments, such as squarylium pigments, anthanthrone pigments, perylene pigments, azo pigments, anthraquinone pigments, pyrene pigments, pyrylium salt pigments, or thiapyrylium salt pigments; and dyes.

These organic pigments generally have several kinds of crystal forms. In particular, for the phthalocyanine compounds, various crystal forms, such as an α type or β type, are known. The organic pigments may be used in the form of any of the crystal forms mentioned above insofar as the pigments can achieve desired sensitivity and other properties according to the purposes.

Among the charge generating materials mentioned above, preferable examples include the phthalocyanine compounds. In this case, when the photosensitive layer is irradiated with light, the phthalocyanine compound contained in the photosensitive layer absorbs photons to generate carriers. In this case, since the phthalocyanine compounds have high quantum efficiency, the absorbed photons are efficiently absorbed to generate carriers.

In the phthalocyanine compounds, phthalocyanines of any one of the following items (1) to (3) are more preferable.

(1) Hydroxygallium phthalocyanine having crystal forms having diffraction peaks at least at angles of 7.6°, 10.0°, 25.2°, and 28.0° in the Bragg angle (2θ±0.2°) of the X-ray diffraction spectrum using Cukα rays, as charge generating materials.

(2) Chlorgallium phthalocyanine having crystal forms having diffraction peaks at least at angles of 7.3°, 16.5°, 25.4°, and 28.1° in the Bragg angle (2θ±0.2°) of the X-ray diffraction spectrum using Cukα rays, as charge generating materials.

(3) Titanylphthalocyanine having crystal forms having diffraction peaks at least at angles of 9.5°, 24.2°, and 27.3° in the Bragg angle (2θ±0.2°) of the X-ray diffraction spectrum using Cukα rays, as a charge generating material.

In particular, these phthalocyanine compounds not only have a high photosensitivity but have a high stability of the photosensitivity. Therefore, a photoreceptor having a photosensitive layer containing any of these phthalocyanine compounds is preferable as a photoreceptor of a color image forming device in which high-speed image formation and reproducibility are demanded.

The peak intensity or position sometimes deviates from these values depending on crystal shapes or measurement methods. However, when the compound has the X diffraction patterns basically in agreement with any of the above, it is judged that the compound has the same crystal form.

Examples of binder resins for use in the charge generating layer 2 include the following substances.

More specifically, examples include a polycarbonat resins, such as a bisphenol A type or a bisphenol Z type, and copolymers thereof, a polyarylate resin, a polyester resin, a methacrylic resin, an acrylic resin, a polyvinyl chloride resin, a polystyrene resin, a polyvinyl acetate resin, a styrene-butadiene copolymer resin, a vinylidene chloride-acrylicnitrile copolymer resin, a vinyl chloride-vinyl acetate-maleic anhydride resin, a silicone resin, a silicone-alkyd resin, a phenol-formaldehyde resin, a styrene-alkyd resin, and poly-N-vinylcarbazole.

One kind of these binder resins may be used singly or two or more kind thereof may be used as a mixture. The mixing ratio of the charge generating material and the binder resin (Charge generating material:Binding resin) is preferably in the range of 10:1 to 1:10 in terms of weight ratio. The thickness of the charge generating layer 2 is preferably in the range of from 0.01 μm to 5 μm and more preferably in the range of from 0.05 μm to 2.0 μm.

The charge generating layer 2 may contain at least one electron accepting substance for the purpose improving the sensitivity, reducing the residual potential, reducing the fatigue when repeatedly used, etc. Examples of the electron accepting substance for use in the charge generating layer 2 include succinic anhydride, maleic anhydride, dibrom maleic anhydride, phthalic anhydride, tetrabromphthalic anhydride, tetracyanoethylene, tetracyanoquinodimethane, o-dinitrobenzene, m-dinitrobenzene, chloranil, dinitroanthraquinone, trinitrofluorenone, picric acid, o-nitrobenzoic acid, p-nitrobenzoic acid, and phthalic acid. Among the above, a fluorenone compound, a quinone compound, or a benzene derivative having an electron withdrawing substituent, such as Cl, CN or $NO_2$, are preferable.

Examples of methods for dispersing the charge generating materials in resins include methods, such as a roll mill, a ball mill, a vibration ball mill, an attritor, a dyno mill, a sand mill, or a colloid mill.

Examples of the solvent for use in a coating liquid for forming the charge generating layer 2 include known organic solvents: such as aromatic hydrocarbon solvents, such as toluene or chlorobenzene, aliphatic alcohol solvents, such as methanol, ethanol, n-propanol, iso-propanol, or n-butanol, ketone solvents, such as acetone, cyclohexanone, or 2-butanone, halogenated aliphatic hydrocarbon solvents, such as methylene chloride, chloroform, or ethylene chloride, cyclic or straight-chain ether solvents, such as tetrahydrofuran, dioxane, ethylene glycol, or diethylether, or ester solvents, such as methyl acetate, ethyl acetate, or n-butyl acetate.

One kind of these solvents may be used singly or two or more kinds thereof may be used in combination. When two or more kinds of the solvents are used as a mixture, solvents that can dissolve the binder resin are used as a mixed solvent, for example. However, when the photosensitive layer has a layer structure in which the charge transport layer and the charge generating layer are formed in this order from the conductive substrate side and the charge generating layer is formed by a coating method by which the lower layer is easily dissolved, such as dip coating, a solvent that does not dissolve a lower layer, such as the charge transport layer, is preferably used for forming the charge generating layer. When the charge generating layer is formed by spray coating or ring coating, which hardly causes erosion of the lower layer, the solvent may be selected from a wider range of solvents.

—Charge Transport Layer—

Examples of charge transport materials for use in the charge transport layer 3 include the following substances. More specifically, examples of the charge transport material include hole transport materials, such as: oxadiazole derivatives, such as 2,5-bis(p-diethylaminophenyl)-1,3,4-oxadiazole; pyrazoline derivatives, such as 1,3,5-triphenyl-pyrazoline or 1-[pyridyl-(2)]-3-(p-diethylaminostyryl)-5-(p-diethylaminostyryl)pyrazoline; aromatic tertiary amino compounds, such as triphenylamine, tri(p-methyl)phenylamine, N,N-bis(3,4-dimethylphenyl)biphenyl-4-amine, dibenzylaniline, or 9,9-dimethyl-N,N-di(p-tolyl)fluorenone-2-amine; aromatic tertiary diamino compounds, such as N,N'-diphenyl-N,N'-bis(3-methylphenyl)-[1,1-biphenyl]-4,4'-diamine; 1,2,4-triazine derivatives, such as 3-(4'dimethylaminophenyl)-5,6-di-(4'-methoxyphenyl)-1,2,4-triazine; hydrazone derivatives, such as 4-diethylaminobenzaldehyde-1,1-diphenylhydrazone, 4-diphenylaminobenzaldehyde-1,1-diphenylhydrazone, [p-(diethylamino)phenyl](1-naphthyl)phenylhydrazone, 1-pyrenediphenylhydrazone, 9-ethyl-3-[(2-methyl-1-indolinylimino)methyl]carbazole, 4-(2-methyl-1-indolinyliminomethyl)triphenylamine, 9-methyl-3-carbazolediphenylhydrazone, 1,1-di-(4,4'-methoxyphenyl)acrylaldehydediphenylhydrazone, or β,β-bis(methoxyphenyl)vinyldiphenylhydrazone; quinazoline derivatives, such as 2-phenyl-4-styryl-quinazoline; benzofuran derivatives, such as 6-hydroxy-2,3-di(p-methoxyphenyl)-benzofuran; α-stilbene derivatives, such as p-(2,2-diphenylvinyl)-N,N-diphenylaniline; enamine derivatives; carbazole derivatives, such as N-ethylcarbazole; poly-N-vinylcarbazole and derivatives thereof. Examples of the charge transport materials for use in the charge transport layer 3 further include polymers having a group including any of the above compounds in the main chain or side chain. One kind of these charge transport materials may be used singly or two or more kinds thereof may be used in combination.

The binder resin for use in the charge transport layer 3 is not particularly limited. However, the binder resin is particularly preferably a resin having a compatibility with the charge transport materials and an appropriate strength.

Examples of the binder resin include: various polycarbonate resins containing bisphenol A, bisphenol Z, bisphenol C, bisphenol TP, or the like, and copolymers thereof, a polyalylate resin and copolymers thereof, a polyester resin, a methacrylic resin, an acrylic resin, a polyvinylchloride resin, a polyvinylidene chloride resin, a polystyrene resin, a polyvinyl acetate resin, a styrene-butadiene copolymer resin, a vinyl chloride-vinyl acetate copolymer resin, a vinyl chloride-vinyl acetate-maleic anhydride copolymer resin, a silicone resin, a silicone-alkyd resin, a phenol-formaldehyde resin, a styrene-acrylic copolymer resin, a styrene-alkyd resin, a poly-N-vinylcarbazole resin, a polyvinyl butyral resin, and a polyphenylene ether resin. These resins are used singly or as a mixture of two or more kinds thereof.

The molecular weight of the binder resin for use in the charge transport layer is selected according to the film forming conditions, such as the thickness of the photosensitive layer and the kind of solvent. In usual, the molecular weight thereof is preferably in the range of from 3,000 to 300,000 and more preferably from 20,000 to 200,000 in terms of viscosity average molecular weight.

The charge transport layer 3 is formed by applying and drying a solution in which the charge transport material and the binder resin mentioned above are dissolved in a suitable solvent. Examples of the solvent for use in the coating liquid for forming the charge transport layer include aromatic hydrocarbons, such as benzene, toluene, or chlorobenzene, ketones, such as acetone or 2-butanone, halogenated aliphatic hydrocarbons, such as methylene chloride, chloroform, or ethylene chloride, cyclic or straight-chain ethers, such as tetrahydrofuran, dioxane, ethylene glycol, or diethylether; and a mixed solvent thereof.

The mixing ratio of the charge transport material to the binder resin may be in the range of 10:1 to 1:5.

The thickness of the charge transport layer is generally preferably in the range of from 5 μm to 50 μm and more preferably in the range of 10 μm to 40 μm.

The charge transport layer 3 and/or the charge generating layer 2 may contain additives, such as an antioxidant, a photostabilizer, or a heat stabilizer, in order to prevent the degradation of the photoreceptor by the ozone or oxidative gases generating in the image-forming device, heat, or light.

Examples of the antioxidants include hindered phenols, hindered amines, p-phenylenediamine, arylalkanes, hydroquinone, spirochromane, spiroindanone and derivatives thereof, organic sulfur compounds, and organic phosphorus compounds.

The charge transport layer 3 is formed by, for example, applying and drying a solution in which the charge transport material and the binder resin mentioned above are dissolved in a suitable solvent. Examples of the solvent for use in the preparation of a coating liquid for forming the charge transport layer include an aromatic hydrocarbon solvent, such as benzene, toluene, or chlorobenzene, a ketone solvent, such as acetone or 2-butanone, a halogenated aliphatic hydrocarbon solvent, such as methylene chloride, chloroform, or ethylene chloride, a cyclic or straight-chain ether solvent, such as tetrahydrofuran, dioxane, ethylene glycol, or diethylether, and a mixed solvent thereof.

To the coating liquid for forming the charge transport layer, silicone oil may be added as a leveling agent for improving the smoothness of a coated film to be formed by coating.

The mixing ratio of the charge transport material and the binder resin may be 10:1 to 1:5 in terms of weight ratio.

The thickness of the charge transport layer is generally preferably in the range of from 5 μm to 50 μm and more preferably in the range of from 10 μm to 30 μm.

The coating liquid for forming the charge transport layer may be applied by coating method, such as dip coating, ring coating, spray coating, bead coating, blade coating, roller coating, knife coating, or curtain coating, according to the shape or application of the photoreceptor. The applied liquid is preferably dried first by set to touch at room temperature (e.g., from 20° C. to 30° C.) and then by heating. The drying by heating is preferably carried out at a temperature in the range of from 30° C. to 200° C. for from 5 minutes to 2 hours.

As the charge transport layer 3, known charge transport layers, such as the charge transport layer described in Paragraphs 0137 to 0150 of JP-A No. 2008-076520, for example, may be used.

—Surface Layer—

The surface layer 4 contains gallium, zinc, and oxygen, in which a ratio of the number of atoms of the zinc to the number of atoms of the gallium (number of atoms of zinc/number of atoms of gallium) is from 0.01 (or about 0.01) to 0.6 (or about 0.6) and the ratio of the number of atoms of the oxygen to the sum of the number of atoms of the gallium and the zinc (number of atoms of oxygen/(number of atoms of gallium+number of atoms of zinc)) is from 1.0 (or about 1.0) to 1.6 (about 1.6). When the oxide materials having such a composition ratio is used, a layer having high hardness and high light transmittance, having a volume resistivity of from $10^5$ Ωcm to $10^3$ Ωcm, having low hydrophilicity, and having excellent chemical stability, may be provided.

The ratio of the number of atoms of the zinc to the number of atoms of the gallium (number of atoms of zinc/number of atoms of gallium) is preferably from 0.01 to 0.5 from the view point of chemical stability and light transmittance.

The ratio of the number of atoms of the oxygen to the sum of the number of atoms of gallium and the number of atoms of zinc (number of atoms of oxygen/(number of atoms of gallium+number of atoms of zinc)) is preferably from 1.1 to 1.5 from the view point of chemical stability and light transmittance.

In this exemplary embodiment, the composition of the GaZnO material, the ratio of the number of atoms, and the distribution in the film thickness direction are determined by Rutherford back scattering ("RBS").

For RBS, an accelerator (trade name: 3SDH PELLETRON, manufactured by NEC corporation), an end station (trade name: RBS-400, manufactured by CE & A Co., Ltd.), and a system (trade name: 3S-R10) are used. For analysis, a HYPRA program (trade name, product of CE & A Co., Ltd.) is used.

The RBS measuring conditions are as follows: the He++ ion beam energy is 2.275 eV, the detection angle is 160°, and the Grazing Angle relative to incident beam is 109°.

The RBS measurement is specifically performed as follows.

First, He++ ion beam vertically falls onto a sample, a detector is placed at an angle of 160° relative to the ion beam, and the signal of He backscattered backward is measured. The composition ratio and the film thickness thereof are determined from the detected He energy and intensity. The spectrum may be measured from two detection angles for improvement of the measurement accuracy of the composition ratio and film thickness. The measurement accuracy is improved by crosschecking the results by measurement from two detection angles different in resolutions in the depth direction and backward scattering kinetics.

The number of He atoms scattered backward by the target atom depends on the following three factors: 1) the atomic number of the target atom, 2) the energy of the He atom before scattering, and 3) the scattering angle.

The density is calculated from the measured composition, and the film thickness is calculated from the density. The error of density is within 20%.

The content of each element in the entire surface layer is measured by secondary electron mass spectrometry or XPS (X-ray photoelectron spectroscopy), for example.

Zinc may be approximately uniformly distributed in the thickness direction of the surface layer 4 or may be unevenly distributed. For example, the zinc concentration at the outermost surface side may be low and oxygen, gallium, and a Group XIII element other than gallium (Al, In, etc.) may be contained in the vicinity of the outermost surface. Alternatively, the zinc concentration may be high at the outermost surface side.

From the viewpoint of suppression of light transmittance reduction, suppression of an increase in resistance, suppression of hydrophilicity, etc., the zinc proportion relative to the sum of the number of atoms of the gallium, zinc, and oxygen is preferably from 0.4% by atom (or about 0.4% by atom) to 25% by atom (or about 25% by atom) and more preferably from 0.4% by atom (or about 0.4% by atom) to 20% by atom (or about 20% by atom).

Films containing the GaZnO materials according to this exemplary embodiment (may be referred to as a "GaZnO film") may be a non-single crystal material, such as a microcrystal material, a polycrystal material, or an amorphous material. Among the above, the amorphous film is preferable in terms of surface smoothness and the microcrystal film is preferable in terms of hardness.

For controlling the conductive type, the GaZnO film may contain one or more elements selected from Si, Ge, and Sn for an n type, and may contain one or more elements selected from Be, Mg, Ca, and Sr for a p type.

The GaZnO film may contain hydrogen and/or a halogen atom. The content of the hydrogen is preferably from 5% by atom to 25% by atom relative to the sum of the number of atoms of the gallium, zinc, oxygen, and hydrogen from the viewpoint of increasing the chemical stability of the film.

In the case of a microcrystalline, polycrystalline or amorphous type, there are many bonding defects, dislocation defects, crystal grain boundary defects as compared with the single crystals. Therefore, when hydrogen and/or a halogen atom are contained in the GaZnO film, the bond defects or the like may be effectively inactivated. More specifically, the hydrogen or halogen atoms are captured into the bond defects or the defects in grain boundaries in crystals to perform electric compensation. Therefore, trapping involving the occurrence of photo carriers and diffusion or movement of the carriers may be suppressed, which may result in free or less reaction active sites. Thus, a more stable surface layer may be obtained.

The content of the hydrogen is determined by measuring the absolute value by a hydrogen forward scattering (HFS). The content of the hydrogen may be estimated by an infrared absorption spectrum.

For HFS, an accelerator (trade name: 3SDH PELLETRON, manufactured by NEC), an end station (trade name: RBS-400, manufactured by CE & A Co., Ltd.), and a system (trade name: 3S-R10, manufactured by CE & A Co., Ltd.) are used.

For analysis, a HYPRA program (trade name, product of CE & A Co., Ltd.) is used.

The HFS measuring conditions are as follows:

the He++ ion beam energy is 2.275 eV, the detection angle is 160°, and the Grazing Angle relative to incident beam is 30°.

In the HFS measurement, a detector is placed at a position at an angle of 30° relative to the He++ ion beam, and a sample is placed at an angle of 75° relative to the normal line, whereby hydrogen signals scattered in front of a sample are collected. In the measurement, the detector is preferably covered with a thin aluminum foil to remove He atoms scattered with hydrogen. The quantitative determination is performed by comparing the hydrogen counts of a test sample with that of a reference sample after normalization with blocking power. As the reference sample, a sample in which H ions have been injected in Si and white mica are used.

The white mica is known to have a hydrogen concentration of 6.5% by atom.

The amount of H adsorbed onto the outermost layer is corrected by subtracting the H amount adsorbed onto a clean Si surface.

The cross section of the growth the surface layer may have a pillar-shaped structure. However, from the viewpoint of slipping properties, a structure having high flatness is preferable, and an amorphous substance is preferable.

In order to increase the adhesiveness with a photosensitive layer and to improve the surface slipping properties, a lower layer side of the surface layer may be microcrystalline and the outermost surface side may be amorphous.

Examples of a photoreceptor to which the surface layer of the GaZnO film according to this exemplary embodiment is applied include an amorphous silicon photoreceptor containing silicon atoms as a main component and an organic photoreceptor having a function-separated type structure using an organic polymer.

The amorphous silicon photoreceptor containing silicon atoms as a main component may be a photoreceptor for positive charging or negative charging. The amorphous silicon photoreceptor may have a surface layer containing the GaZnO material according to this exemplary embodiment on the charge injection inhibition layer provided as an intermediate layer. The amorphous silicon photoreceptor may have a second surface layer containing the GaZnO material according to this exemplary embodiment as a surface modified layer on a first surface layer.

Examples of the top layer except the surface layer (i.e., the layer that is disposed below the surface layer so as to be adjacent to the surface layer) of the amorphous silicon photoreceptor for positive charging or negative charging in which the surface layer according to this exemplary embodiment is formed, include a p type amorphous silicon layer, an n type amorphous silicon layer, an $Si_xO_{1-x}$:H layer, an $Si_xN_{1-x}$:H layer, an $Si_xC_{1-x}$:H layer, and an amorphous carbon layer.

In the amorphous silicon photoreceptor containing silicon atoms as a main component, the chemical stability is generally low and is usually required to have a heater in the photoreceptor. However, when a film containing the GaZnO material according to this exemplary embodiment is used as the charge transport layer on the amorphous silicon photosensitive layer, the chemical stability may be high, which may eliminate the necessity of providing a heater thereinside.

In contrast, in the case of an organic photoreceptor, the photoreceptor may have a function-integrated type photosensitive layer in which the charge generating layer and the charge transport layer are integrated or may have a function-separated type photosensitive layer in which the charge generating layer and the charge transport layer are disposed as separate layers.

In the case of the function-separated type, the charge generating layer may be provided on the surface side or the charge transport layer may be provided on the surface side. The surface layer containing the GaZnO material according to this exemplary embodiment may be directly provided on these photosensitive layers or an intermediate layer for adjusting the hardness, expansion coefficient, elasticity, etc., may be provided between the surface layer and the photosensitive layer. For example, an intermediate layer (hard layer) having hardness between the hardness of the photosensitive layer and the hardness of the surface layer of the GaZnO material according to this exemplary embodiment may be provided on the photosensitive layer or the charge transport layer for reducing elastic distortion and a layer softer (low hardness) than the surface layer may be provided.

The electrophotographic photoreceptor may be provided with an absorption layer for absorbing a short wavelength light, such as ultraviolet rays, so as to prevent the photosensitive layer from decomposing by irradiation with electromagnetic radiation of shorter wavelength other than heat during the formation of the surface layer.

Moreover, a film having a small band gap may be formed at early stages of the formation of the surface layer so that the organic photosensitive layer is not irradiated with short wavelength light. For example, a $Ga_xIn_{1-x}N$ film ($0 \leqq x \leqq 0.99$) containing In may be used.

A layer in which a UV absorber or an antioxidant has been dispersed in a polymer resin may be formed by coating or the like or a layer containing a UV absorber may be provided on the charge transport layer.

By providing the layer absorbing short wavelength light, such as ultraviolet rays, described above before the formation of the surface layer, influences of ultraviolet rays when the surface layer is formed may be suppressed and moreover influences from corona discharging or short wavelength light, such as ultraviolet rays, from various kinds of light sources during printing in an image forming device may be suppressed.

The surface layer of the GaZnO material may contain an n type element or p type element for controlling the conductive type. The surface layer containing the element of an n type or a p type may be used as the charge injection inhibition layer, or may be used as a charge injection layer. When used as the charge injection layer, charges are trapped on the surface of the intermediate layer or the photosensitive layer. When negatively charged, the n type layer functions as the charge injection layer and the p type layer functions as the charge injection inhibition layer. When positively charged, the n type layer functions as the charge injection inhibition layer and the p type layer functions as the charge injection layer.

The thickness of the surface layer 4 is preferably in the range of from 0.1 μm to 10 μm from the viewpoint of wear resistance, chemical stability, and light transmittance.

<Method of Forming Surface Layer>

Next, a method of forming the surface layer in this exemplary embodiment of the invention is described. As a method for forming the surface layer of the GaZnO material according to this exemplary embodiment, a known vapor deposition method, such as a plasma CVD (Chemical Vapor Deposition) method, a metal organic chemical vapor deposition method, a molecular beam epitaxy method, a vapor deposition method, or a sputtering method, may be used. From the viewpoint of obtaining high adhesiveness, it is preferable to use a remote plasma metalorganic chemical deposition method.

Figure 4A:
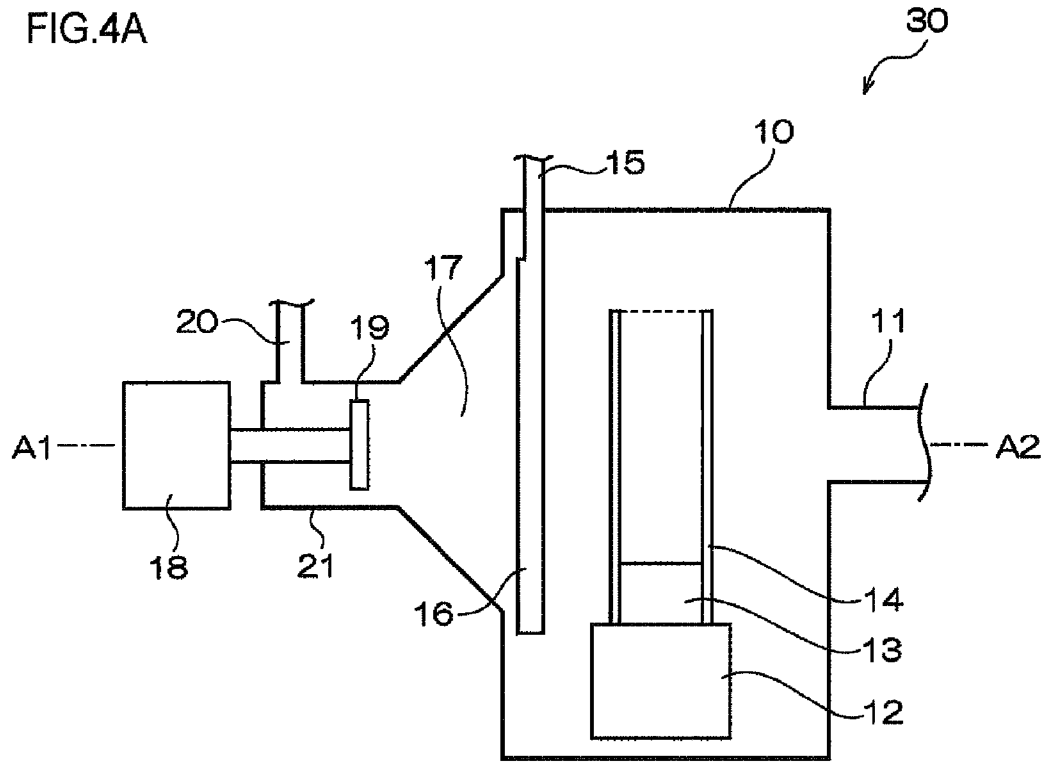
FIG. 4A is a schematic view illustrating an example of the structure of a film forming device for use in the formation of oxide materials according to an exemplary embodiment of the present invention.
Figure 4B:
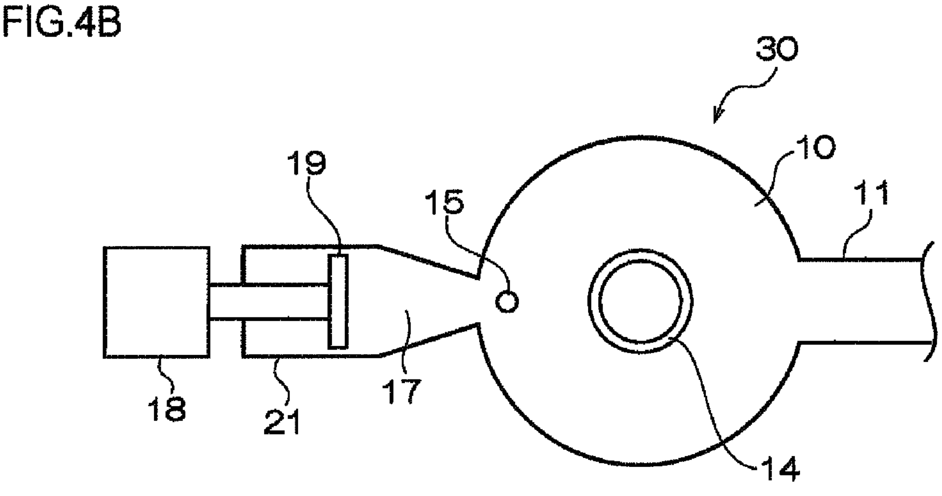
FIG. 4B is a schematic view illustrating the cross section along the line A1-A2 of the film forming device illustrated in FIG. 4A.
Figure 10:
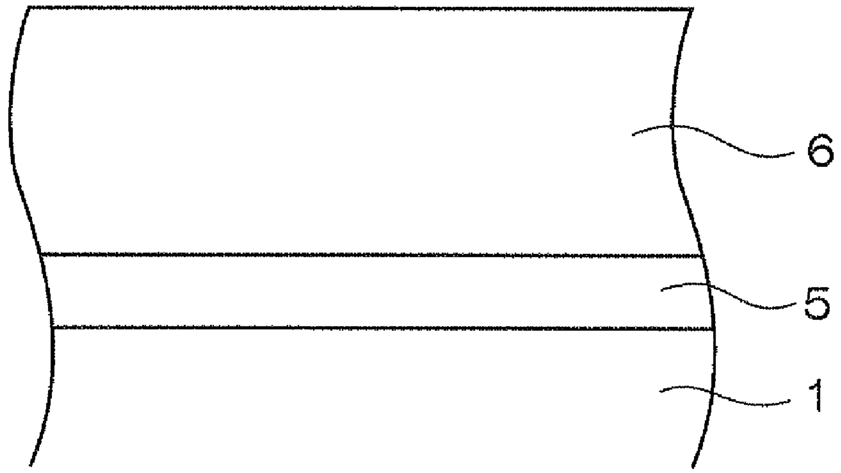
FIG. 10 is a schematic view illustrating an example of a layer structure of the electrophotographic photoreceptor according to an exemplary embodiment of the present invention.

FIG. 4A illustrates an example of the structure of a film forming device by the remote plasma metalorganic chemical deposition method for use in the formation of the GaZnO material according to this exemplary embodiment. FIG. 4B schematically illustrates the cross section along the line A1-A2 of a film forming device 30 illustrated in FIG. 4A. In FIGS. 4A and 4B, 10 denotes a film forming chamber, 11 denotes an exhaust vent, 12 denotes a base rotating portion, 13 denotes a base support member, 14 denotes a base as a treatment target, 15 denotes a gas introduction pipe, 16 denotes a shower nozzle which has an opening for spraying gas introduced from the gas introduction pipe 15, 17 denotes a plasma diffusion portion, 18 denotes a high-frequency power supply portion, 19 denotes a flat plate electrode, 20 denotes a gas introduction pipe, and 21 denotes a high frequency discharge pipe portion.

In the film forming device 30 illustrated in FIGS. 4A and 4B, the exhaust vent 11 connected to a vacuum exhaust device not illustrated in the drawings is provided at one end of the film forming chamber 10 and a plasma generating device is provided on the side opposite to the exhaust vent 11 of the film fanning chamber 10.

The plasma generating device has the high-frequency discharge pipe portion 21, the flat plate electrode 19 disposed in the high-frequency discharge pipe portion 21 with its discharge surface facing the exhaust vent 11, and the high-frequency power supply portion 18 disposed outside the high-frequency discharge pipe portion 21 and connected to the surface opposite to the discharge surface of the flat plate electrode 19. The gas introduction pipe 20 for supplying a gas into the high-frequency discharge pipe portion 21 is connected to the high-frequency discharge pipe portion 21 and the other end of the gas introduction pipe 20 is connected to a first gas supply source not illustrated in the drawings.

Figure 5:
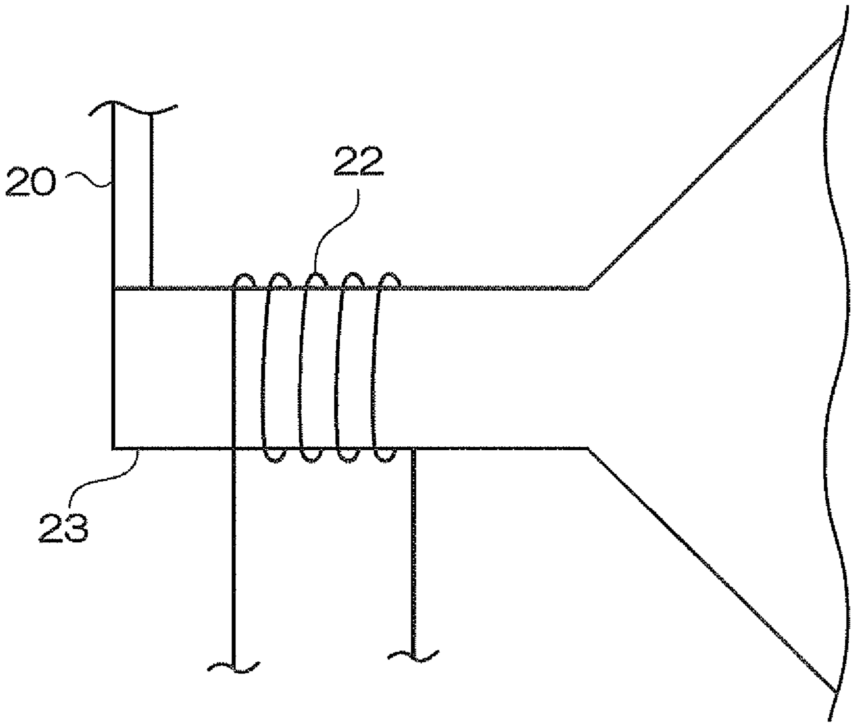
FIG. 5 is a schematic view illustrating another example of a plasma generator for use in the formation of the oxide materials according to an exemplary embodiment of the present invention.

A plasma generating device illustrated in FIG. 5 may be used in place of the plasma generating device provided in the film forming device illustrated in FIGS. 4A and 4B. FIG. 5 schematically illustrates a side view of another example of a plasma generating device which may be used in the film forming device of FIGS. 4A and 4B. In FIG. 5, 22 denotes a high frequency coil, 23 denotes a quarts pipe, 20 denotes a gas induction pipe as in FIG. 4A. The plasma generating device has a quartz pipe 23 and a high-frequency coil 22 formed along the peripheral surface of the quartz pipe 23, and one end of the quartz pipe 23 is connected to the film forming chamber 10 (not illustrated in FIG. 5). To the other end of the quartz pipe 23, the gas introduction pipe 20 for introducing a gas into the quartz pipe 23 is connected in the same manner as in the device illustrated in FIG. 5. When a high frequency wave of 13.56 MHz is applied to the high-frequency coil, electrical discharge occurs in the quartz pipe 23.

In FIG. 48, a rod-shaped shower nozzle 16 almost in parallel to the discharge surface is connected to the discharge surface side of the flat plate electrode 19. One end of the shower nozzle 16 is connected to the gas introduction pipe 15. The gas introduction pipe 15 is connected to a second gas supply source not illustrated in the drawings provided outside the film forming chamber 10.

In order to introduce oxygen into a film, by mixing an oxygen gas or a gas containing oxygen, such as $N_2O$ or $H_2O$, with the raw material gasses of Ga gas and Zn gas during film formation, a film containing oxygen atoms, gallium atoms and zinc atoms is formed. When oxidation by oxygen is performed after the film formation, the oxidation may be performed in vacuum or in the air. When performed in vacuum, high frequency discharge may be performed using an oxygen gas diluted with rare gas or the like, for example, to introduce oxygen into a film. As methods for introducing a element, not limited to oxygen, into a film, a known method, such as a thermal diffusion method or an ion-implantation method may be employed.

In this device, $N_2$ is used to introduce the raw material gasses into the high frequency discharge pipe 21 from the gas introduction pipe 20, for example. A radiowave of 13.56 MHz is supplied to the high frequency power supply portion 18 and a matching circuit to cause discharge in the electrode 19 and the plasma diffusion portion 17.

The base rotating portion 12 is provided in the film forming chamber 10 and a cylindrical base (treatment target) 14 is connected via the base support member 13 to the base rotating portion 12 so that the longitudinal direction of the shower nozzle and the axial direction of the base (treatment target) 14 face each other almost in parallel. During the film formation, the base 14 is rotated in the circumferential direction by the rotation of the base rotating portion 12. As the base 14, a photoreceptor in which a photosensitive layer has been formed beforehand is used.

When a surface layer containing the GaZnO material according to this exemplary embodiment is formed on the surface (peripheral surface) of the base 14 using the film forming device 30, the film formation may be performed as follows.

First, together with the introduction of an oxygen ($O_2$) gas (or a helium (He)-diluted oxygen gas) and a helium gas and, as required, a hydrogen ($H_2$) gas into the high frequency discharge pipe 21 from the gas introduction pipe 20, a radio-wave of 13.56 MHz is applied to the flat plate electrode 19 from the high frequency power supply portion 18. In this case, the plasma diffusion portion 17 is formed so as to extend radially from the discharge surface side of the flat plate electrode 19 to the exhaust vent 11 side. Here, the gas introduced from the gas introduction pipe 20 flows from the flat plate electrode 19 side to the exhaust vent 11 in the film forming chamber 10. The surrounding of the flat plate electrode 19 may be surrounded with an earth shield.

Next, for example, a trimethylgallium gas and an organic zinc gas (e.g., dimethyl zinc or diethyl zinc) as raw material gasses are introduced from the gas introduction pipe 15, and then introduced into the film forming chamber 10 through the shower nozzle 16 located at the downstream side of the flat plate electrode 19 that is an activating measure. Then, hydrogen or a rare gas with which oxygen has been mixed is introduced from another introduction pipe 20 to cause glow discharge. Thus, a non-single crystal film containing hydrogen, gallium, zinc, and oxygen is formed on the surface of the base 14.

During the film formation, the trimethylgallium gas and the organic zinc are introduced into the gas introduction pipe 15, in the form of gas, from separate containers. The concentration of each material gas is adjusted so that the ratio of the number of atoms of the zinc to the number of atoms of the gallium (number of atoms of zinc/number of atoms of gallium) is from 0.01 (or about 0.01) to 0.6 (or about 0.06) and that the ratio of the number of atoms of the oxygen to the sum of the number of atoms of the gallium and the number of atoms of zinc (number of atoms of oxygen/(number of atoms of gallium+number of atoms of zinc)) is from 1.0 (or about 1.0) to 1.6 (or about 1.6).

When the organic photoreceptor having an organic photosensitive layer is used, the surface temperature of the base 14 during the film formation of the surface layer is preferably 150° C. or lower, more preferably 100° C. or lower, and still more preferably from 30° C. to 100° C. Even when the surface temperature of the base 14 is 150° C. or lower when the film formation is initiated, the organic photosensitive layer may be damaged by heat when the temperature becomes higher than 150° C. by the influence of plasma. Therefore, the surface temperature of the base 14 may be controlled in considering the influence.

In contrast, when an amorphous silicon photoreceptor is used, the surface temperature of the base 14 during the film formation of the surface layer may be from 50° C. to 350° C., for example.

The surface temperature of the base 14 may be controlled by a heating and/or cooling member (not illustrated) or by a natural increase in temperature during discharge. In order to heat the base 14, a heater may be provided outside or inside the base 14. In order to cool the base 14, a cooling gas or liquid may be circulated inside the base 14. Even when a rare gas, such as He, is singly used, for example, in place of $H_2$, the rare gas may be mixed with an $H_2$ gas, and a mixed gas may be passed through the gas introduction pipe 20 to cause glow discharge.

In order to avoid an increase in the surface temperature of the base 14 by discharge, it is effective to adjust the flow of the high energy gas supplied onto the surface of the base 14. In this case, conditions, such as the flow rate of gas, discharge output, or pressure, may be adjusted so as to achieve a target temperature.

In order to control the conductive type of the surface layer, a dopant may be added thereto. As a method for doping a dopant during the film formation, $SiH_3$, $SnH_4$, or the like may be used in the form of gas for an n-type surface layer and, in contrast, biscyclopentadienylmagnesium, dimethylcalcium, dimethylstrontium, or the like may be used in the form of gas for a p-type surface layer. A known method, such as a thermal diffusion method or an ion injection method, may be used for doping a dopant element into the surface layer.

Specifically, a surface layer having an n-type or a p-type is obtained by introducing a gas containing at least one dopant element into the film forming chamber 10 via the gas introduction pipe 15 and the shower nozzle 16.

In the film forming device described with reference to FIGS. 4A, 4B, and 5, active nitrogen or active hydrogen formed by electrical discharge energy may be independently controlled by providing plural activation devices or a gas containing nitrogen and hydrogen atoms, such as $NH_3$, may be used. Furthermore, $H_2$ may be added. The conditions in which active hydrogen is isolated and formed from an organic metal compound may be used. Thus, activated carbon atoms, gallium atoms, nitrogen atoms, hydrogen atoms, etc., are present, while being controlled, on the surface of the base 14. Then, the activated hydrogen atoms have an effect of removing hydrogen of a hydrocarbon group, such as a methyl group or an ethyl group, contained in the organic metal compound, to generate hydrogen molecules. Therefore, a hard film (surface layer) having a three-dimensional bond is formed.

In the film forming device illustrated in FIGS. 4A, 4B, and 5, a high-frequency oscillator is used for a plasma generating device, but the plasma generating device is not limited thereto. Examples thereof include a microwave oscillator and a device of an electrocyclotron resonance system or a helicon plasma system. A high-frequency oscillator may be an induction or capacitance oscillator. Two or more different kinds of these devices may be used in combination or two devices of the same type may be used in combination. In order to suppress an increase in the surface temperature of the base 14 by the irradiation with plasma, a high frequency oscillation device is preferable. A device for preventing the irradiation of heat may be provided.

When two or more different plasma generating devices are used, it is preferable that discharge be simultaneously caused in the two or more different plasma generating devices at the same pressure. Differences in pressure may be provided between a discharged region and a film forming region (a region at which the base is disposed). These devices may be arranged in series relative to the gas flow ranging from a gas introduction portion to a gas discharge portion in the film forming device or may be arranged so that the devices each face the film forming surface of the base.

For example, when two kinds of the plasma generating devices are disposed in series relative to the gas flow, the devices are utilized as a second plasma generating device that causes discharge in the film forming chamber 10 using the shower nozzle 16 as an electrode utilized in the film forming device illustrated in FIGS. 4A and 4B as an example. In this case, discharge is caused in the film forming chamber 10 by using the shower nozzle 16 as the electrode and applying a high frequency voltage to the shower nozzle 16 via the gas introduction pipe 15. Alternatively, in place of utilizing the shower nozzle 16 as an electrode, by providing a cylindrical electrode between the base 14 and the flat plate electrode 19 in the film forming chamber 10 and by utilizing the cylindrical electrode, discharge is caused in the film forming chamber 10.

When two different kinds of plasma generating devices are used under the same pressure, using, for example, a microwave oscillator and a high frequency oscillator is effective in controlling film quality because these devices can largely change the excitation energy of excited species. The discharge may be conducted near the atmospheric pressure (from 70,000 Pa to 110,000 Pa). When discharging is conducted near the atmospheric pressure, it is preferable to use He as a carrier gas.

For the formation of the surface layer or the like, a common metal organic chemical vapor deposition method or molecular beam epitaxy method may be used other than the methods described above. In the film formation by these methods, the use of an active nitrogen and/or active hydrogen and/or active oxygen may be effective for lowering temperatures. In this case, examples of a nitrogen material include a gas, such as $N_2$, $NH_3$, $NF_3$, $N_2H_4$, or methylhydrazine, an evaporated liquid, or a substance bubbled with a carrier gas. As an oxygen raw material, oxygen, $H_2O$, $CO$, $CO_2$, $NO$, $N_2O$, or the like is used.

As the film formation conditions, when discharge is performed by, for example, high frequency discharge, the frequency is preferably in the range of from 10 kHz to 50 MHz so as to form films at low temperatures. The output depends on the dimension of the base, and is preferably in the range of from 0.01 W/cm$^2$ to 0.2 W/cm$^2$ relative to the surface area of the base. The rotation speed of the base is preferably in the range of from 0.1 rpm to 500 rpm.

As described above, the description is given to the case where the oxide material of this exemplary embodiment (exemplary embodiment A) is used as the surface layer of electrophotographic photoreceptors. However, the oxide material of this exemplary embodiment may be used not only for the surface layer of electrophotographic photoreceptors but other layers, such as an undercoat layer or a charge transport layer. The application of the oxide material of this exemplary embodiment is not limited to layers constituting electrophotographic photoreceptor. The oxide material of this exemplary embodiment may be widely used for electron devices other than electrophotographic photoreceptors, such as an antistatic film of displays of display devices, a charge transport layer of organic electroluminescence elements, an antistatic gas barrier film, or a protective film of solar batteries.

II. Exemplary Embodiment B

<Electrophotographic Photoreceptor>

The electrophotographic photoreceptor of another exemplary embodiment (exemplary embodiment B) includes a substrate; and a photosensitive layer including gallium, oxygen and zinc. Hereinafter, the electrophotographic photoreceptor of this exemplary embodiment (exemplary embodiment B) is described in detail.

Figure 8:
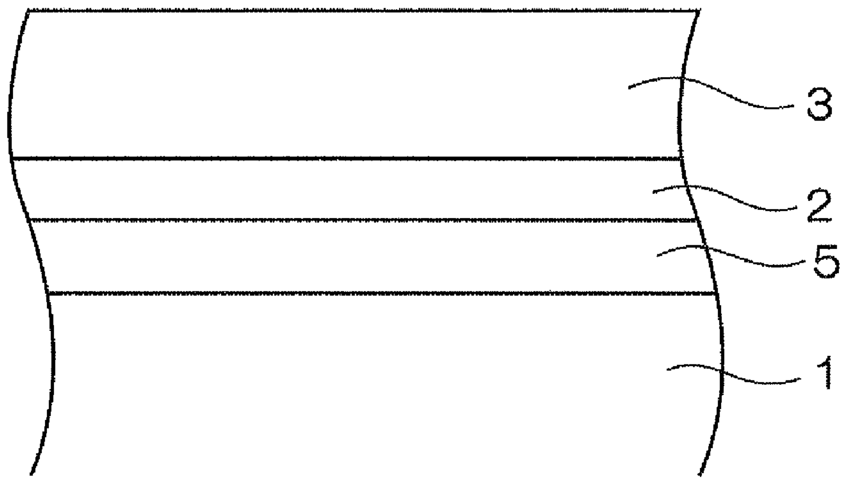
FIG. 8 is a schematic view illustrating an example of a layer structure of an electrophotographic photoreceptor according to an exemplary embodiment of the present invention.

FIG. 8 is a schematic configuration cross sectional view illustrating an example of the layer structure of an electrophotographic photoreceptor of this exemplary embodiment (exemplary embodiment B). In FIG. 8, 1 denotes a substrate, 2 denotes a charge generating layer, 3 denotes a charge transport layer, and 5 denotes an undercoat layer.

The photoreceptor illustrated in FIG. 8 is a photoreceptor of positive charge type that has a layer structure in which the undercoat layer 5, the charge generating layer 2, and the charge transport layer 3 are disposed in the order on the substrate 1, and a photosensitive layer includes two layers of the charge generating layer 2 and the charge transport layer 3.

The charge transport layer 3 contains gallium (Ga), oxygen (O), and zinc (Zn). The charge generating layer 2 may be formed from organic polymer compound(s), inorganic material(s), or a combination thereof.

Figure 9:
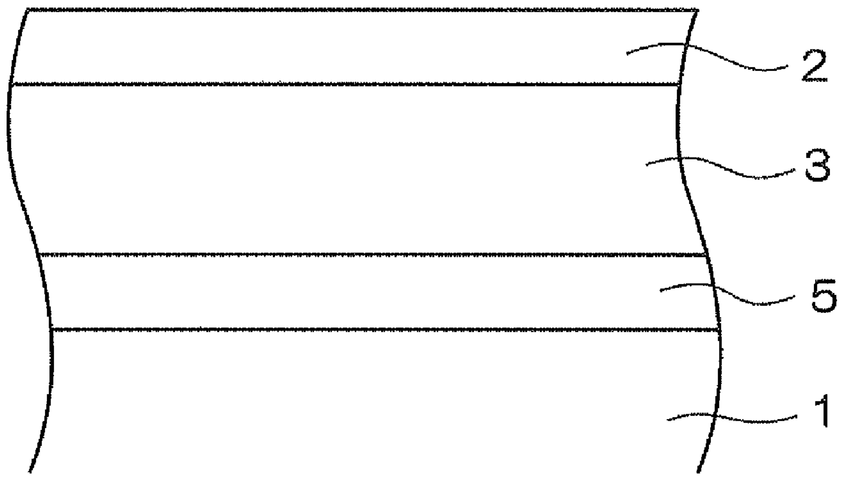
FIG. 9 is a schematic view illustrating an example of a layer structure of the electrophotographic photoreceptor according to an exemplary embodiment of the present invention.

FIG. 9 is a schematic configuration cross sectional view illustrating another example of the layer structure of the electrophotographic photoreceptor of exemplary embodiment B. The same reference numerals of FIG. 8 are given to the same components as those of FIG. 9.

The photoreceptor illustrated in FIG. 9 is a photoreceptor of negative charge type that has a layer structure in which the undercoat layer 5, the charge transport layer 3, and the charge generating layer 2 are disposed in the order on the substrate 1, and a photosensitive layer includes two layers of the charge transport layer 3 and the charge generating layer 2.

The charge transport layer 3 contains gallium (Ga), oxygen (O), and zinc (Zn). The charge generating layer 2 may be formed from organic polymer compounds, inorganic materials, or a combination thereof.

FIG. 10 is a schematic configuration cross sectional view illustrating another example of the layer structure of the electrophotographic photoreceptor of exemplary embodiment B. In FIG. 10, 6 denotes a photosensitive layer. Besides 6, the same reference numerals of FIG. 1 are given to the same components as those of FIG. 10.

The photoreceptor illustrated in FIG. 10 has a layer structure in which the undercoat layer 5 and a photosensitive layer 6 are disposed in the order on the substrate 1, and the photosensitive layer 6 is a layer in which the functions of the charge generating layer 2 and the charge transport layer 3 are integrated.

The single-layer photosensitive layer 6 in which the functions are integrated contains gallium (Ga), oxygen (O), and zinc (Zn).

Figure 11:
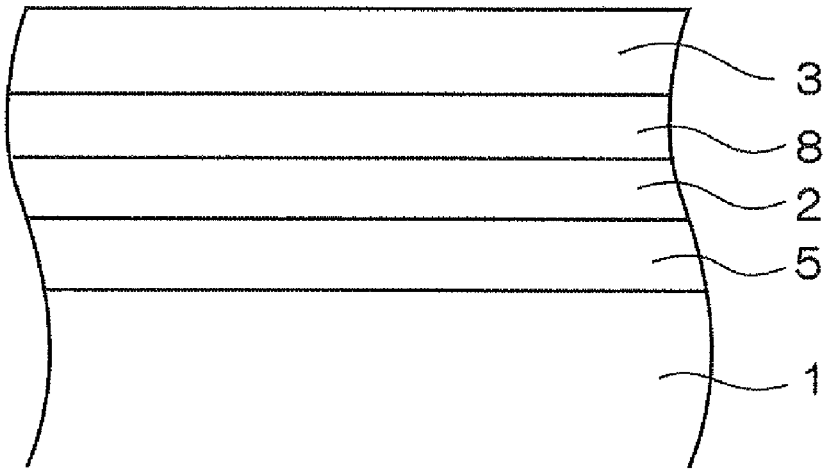
FIG. 11 is a schematic view illustrating an example of a layer structure of the electrophotographic photoreceptor according to an exemplary embodiment of the present invention.

FIG. 11 is a schematic configuration cross sectional view illustrating another example of the layer structure of the electrophotographic photoreceptor of exemplary embodiment B. In FIG. 11, 8 denotes a charge injection layer. Besides 8, the same reference numerals of FIG. 8 are given to the same components as those of FIG. 11.

The photoreceptor illustrated in FIG. 11 has a layer structure in which the undercoat layer 5, the charge generating layer 2, the charge injection layer 8, and the charge transport layer 3 are disposed in the order on the substrate 1, and a photosensitive layer contains three layers of the charge generating layer 2, the charge injection layer 8, and the charge transport layer 3.

The charge transport layer 3 contains gallium (Ga), oxygen (O), and zinc (Zn). The charge generating layer 2 may be formed from organic polymer compounds, inorganic materials, or a combination thereof. It is more preferable that the charge injection layer 8 also contain gallium (Ga), oxygen (O), and zinc (Zn), and in such a case, it is preferable that the content ratio (the ratio of the number of atoms) of zinc (Zn) to gallium (Ga) in the charge injection layer 8 is higher than that in the charge transport layer 3. It is also preferable that the content ratio (the ratio of the number of atoms) of oxygen (O) to gallium (Ga) and zinc (Zn) in the charge injection layer 8 is higher than that in the charge transport layer 3.

Although not illustrated in FIGS. 8 to 11, a surface protection layer may be disposed at the outermost surface.

The electrophotographic photoreceptor (hereinafter sometimes simply referred to as a "photoreceptor") according to exemplary embodiment B includes a substrate and a photosensitive layer containing gallium, oxygen, and zinc.

In the photoreceptor according to Exemplary Embodiment B, zinc is contained in addition to gallium and oxygen in the photosensitive layer and, thus, the sensitivity of the photosensitive layer may become high. The reasons for the above is thought that the charge mobility in the photosensitive layer may increase when zinc is contained, and the transportation properties of charges may become high, and, as a result, the sensitivity may become high.

In exemplary embodiment B, it is preferable that the content of gallium in the photosensitive layer is larger than the content of zinc in the photosensitive layer in terms of a ratio of the number of atoms.

In the photoreceptor according to exemplary embodiment B, the photosensitive layer may have a charge generating layer and a charge transport layer, and, in this case, it is preferable that the charge transport layer contain gallium, oxygen, and zinc.

When the charge transport layer contains zinc in addition to gallium and oxygen, excellent charge injection properties from the charge generating layer to the charge transport layer may be obtained. The reasons for the above is thought that the energy level of the charge generating layer and the charge transport layer may be adjusted in a suitable range.

Particularly, when the charge generating layer and the charge transport layer are disposed in the order on the substrate, the charge generating efficiency may increase by the above-described structure. The reasons for the above is thought that when zinc is contained in the charge transport layer, the excellent charge injection properties may be imparted, and moreover the charge transport layer may become more colorless (transparent), and thus exposure light may more efficiently reach the charge generating layer.

When the photosensitive layer has a charge generating layer and a charge transport layer, it is preferable that the charge generating layer contain an organic charge generating material.

When an inorganic charge transport layer is formed on the charge generating layer (organic charge generating layer) containing an organic charge generating material, the organic charge generating layer may sometimes break. However, in this exemplary embodiment, the occurrence of the breakage of the charge generating layer may be suppressed, i.e., defects may be suppressed. The reasons for the above is thought that the charge transport layer according to this exemplary embodiment can be formed by treatment at low temperatures not causing the breakage.

When the photosensitive layer has a charge generating layer and a charge transport layer, a charge injection layer containing gallium, oxygen, and zinc may be provided between the charge generating layer and the charge transport layer. In this case, it is preferable that the content ratio (the ratio of the number of atoms) of zinc to gallium in the charge injection layer is higher than that in the charge transport layer.

When the content ratio of the zinc in the charge injection layer is higher than that in the charge transport layer, excellent charge injection properties from the charge generating layer to the charge transport layer may be obtained. The reasons for the above is thought that the charge injection properties from the charge generating layer to the charge injection layer may further increase, and since charges are injected through the charge injection layer, charge injection from the charge injection layer to the charge transport layer may also become favorable.

When the photosensitive layer has a charge generating layer and a charge transport layer, a charge injection layer containing gallium, oxygen, and zinc may be provided between the charge generating layer and the charge transport layer. In this case, it is preferable that the content ratio (the ratio of number of atoms) of oxygen to gallium and zinc in the charge injection layer is lower than that in the charge transport layer.

When the content ratio of the zinc in the charge injection layer is higher than that in the charge transport layer, excellent charge injection properties from the charge generating layer to the charge transport layer may be obtained. The reasons for the above is thought that the charge injection properties from the charge generating layer to the charge injection layer may further increase, and since charges are injected through the charge injection layer, charge injection from the charge injection layer to the charge transport layer may also become favorable.

Hereinafter, each layer of the electrophotographic photoreceptor of this exemplary embodiment is described.

—Charge Transport Layer—

The charge transport layer in examples of this exemplary embodiment illustrated in FIGS. 8 to 11 is a layer containing oxygen (O), gallium (Ga), and zinc (Zn) as described above.

The ratio of the number of atoms of oxygen to gallium (oxygen/gallium) in the charge transport layer is preferably from 1.0 to 1.6, more preferably from 1.1 to 1.6, and particularly preferably from 1.2 to 1.6.

It is preferable that the content of gallium in the charge transport layer is larger than the content of zinc in the charge transport layer in terms of the ratio of the number of atoms as described above.

The content of zinc in the charge transport layer is preferably from 1% by atom to 20% by atom, more preferably from 2% by atom to 15% by atom, and still more preferably from 3% by atom to 10% by atom. When the charge transport layer contains gallium, oxygen, and zinc, the content of the zinc in the charge transport layer refers to a ratio (%) of the number of atoms of zinc to the total number of atoms of gallium, oxygen, and zinc.

The ratio of the number of atoms of oxygen to gallium and zinc (oxygen /(gallium+zinc)) in the charge transport layer is preferably from 1.0 to 1.6, more preferably from 1.1 to 1.5, and still more preferably from 1.2 to 1.5.

The ratio of the number of atoms of zinc to gallium (zinc/gallium) in the charge transport layer is preferably 0.5 or lower, more preferably from 0.01 to 0.4, and still more preferably from 0.02 to 0.4.

The content of each element in the whole charge transport layer is measured by a secondary electron mass spectrometry or XPS (X ray photoelectron spectroscopy).

The charge transport layer in this exemplary embodiment is preferably a non-single crystal film containing oxygen (O), gallium (Ga), and zinc (Zn), such as a microcrystalline film, a polycrystalline film, and an amorphous film.

Among the films, the amorphous film is particularly preferable and the microcrystalline film is more preferable.

The cross section of growth of the charge transport layer may have a pillar-shaped structure but an amorphous structure is preferable.

In order to control the conduction type, the charge transport layer may contain one or more elements selected from C, Si, Ge, and Sn in the case of an n type, for example. In the case of, for example, a p type, the charge transport layer may contain one or more elements selected from N, Be, Mg, Ca, and Sr.

It is preferable that the charge transport layer contain at least one of hydrogen and halogen elements, in addition to oxygen (O), gallium (Ga), and zinc (Zn). The hydrogen and halogen elements may be taken into bonding defects in crystals, crystal grain boundary defects, or the like, and perform electric compensation.

The content of the "at least one of hydrogen and halogen elements" in the charge transport layer is preferably from 5% by atom to 25% by atom and more preferably from 10% by atom to 25% by atom.

The content of the hydrogen in the charge transport layer is determined by measuring the absolute value with a hydrogen forward scattering (HFS), for example. The content may be estimated with an infrared absorption spectrum.

For the HFS, 3SDH Pelletron (trade name) of NEC Corp. is used as an accelerator, RBS-400 (trade name) of CE&A is used as an end station, and 3S-R10 (trade name) of CE&A is used as a system.

For analysis, the HYPRA (trade name) program of CE&A is used.

The HFS measurement conditions are as follows:

He++ ion beam energy: 2,275 eV,

Detection angle of 160°, and

Grazing angle with respect to incident beam of about 30°.

In the HFS measurement, a detector is set at 30° with respect to the He++ ion beam, a sample is set at 75° with respect to the normal line, and signals of hydrogen scattering in front of the sample are taken. At this time, it is preferable to cover the detector with an aluminum foil to remove He atoms scattering together with hydrogen. The quantitative determination is performed by comparing the hydrogen counts of a reference sample and a test sample after normalization by blocking power. As the reference sample, a sample in which H ions have been injected in Si and white mica are used.

The white mica is known to have a hydrogen concentration of about 6.5% by atom.

The amount of H adsorbed onto the outermost layer is corrected by subtracting the H amount adsorbed onto a clean Si surface.

Method of Forming Charge Transport Layer

Next, a method of forming the charge transport layer described above is described.

For the formation of the charge transport layer, known vapor deposition methods, such as a plasma CVD (Chemical Vapor Deposition) method, a metal organic chemical vapor deposition method, a molecular beam epitaxy method, vapor deposition, or sputtering, are utilized.

The charge transport layer of the electrophotographic photoreceptor of this exemplary embodiment can be formed using, for example, a film forming device illustrated in FIGS. 4A and 4B, described above.

In place of a plasma generating device provided in the film forming device illustrated in FIGS. 4A and 4B, a plasma generating device illustrated in FIG. 5 may be used.

In FIGS. 4A and 4B, during film formation, the base 14 is rotated in the circumferential direction by the rotation of the base rotating portion 12. In the photoreceptor illustrated in FIG. 8, the base 14 is the substrate 1 on which the undercoat layer 5 and the charge generating layer 2 are formed, in the photoreceptor illustrated in FIG. 9*m* the base 14 is the substrate 1 on which the undercoat layer 5 is formed, and, in the photoreceptor illustrated in FIG. 11, the base 14 is the substrate 1 on which the undercoat layer 5, the charge generating layer 2, and the charge injection layer 8 are formed.

The charge transport layer may be formed as follows, for example.

First, oxygen gas (or helium (He) diluted oxygen gas) and helium (He) gas, and, as required, hydrogen ($H_2$) gas, are introduced from the gas introduction pipe 20 into a high frequency discharge tube portion 21 and a 13.56 MHz radiofrequency wave is supplied to the flat plate electrode 19 from the high frequency power supply portion 18. In this case, a plasma diffusion portion 17 is formed in such a manner as to radially spread from the discharging surface side of the flat plate electrode 19 to an exhaust vent 11. Here, the gas introduced from the gas introduction pipe 20 flows in the film forming chamber 10 into the exhaust vent 11 from the flat plate electrode 19 side. As the flat plate electrode 19, an electrode covered with an earth shield may be used.

Next, by introducing trimethyl gallium gas and organic zinc (e.g., dimethyl zinc or diethyl zinc) gas into the film forming chamber 10 through the gas introduction pipe 15 and a shower nozzle 16 located at the lower stream side of the flat plate electrode 19 that is an activating measure, a non-single crystal film containing gallium (Ga), oxygen (O), and zinc (Zn) is formed on the surface of the base 14. In the process, the trimethyl gallium and the organic zinc are introduced into the gas introduction pipe 15 as gas from separate containers.

The temperature of the surface of the base 14 during the formation of the charge transport layer may be, for example, from 30° C. to 350° C.

The temperature of the surface of the base 14 may be controlled by a heating and/or cooling device (not illustrated) or may be exposed to a natural increase in temperatures during discharge. When the base 14 is heated, a heater may be disposed outside or inside the base 14. When the base 14 is cooled, a cooling gas or liquid may be circulated in the substrate 1.

In order to avoid an increase in the temperature of the surface of the base 14 due to discharge, it is effective to adjust high energy gas flow hitting the surface of the base 14. In this case, conditions, such as a gas flow amount, a discharge output, and a pressure, are adjusted.

Moreover, aluminum-containing organic metal compounds or hydrides, such as diborane, may be used in place of the trimethyl gallium gas and two or more kinds thereof may be mixed.

For example, at the early stage of the formation of the charge transport layer, trimethylindium may be introduced into the film forming chamber 10 through the gas introduction pipe 15 and the shower nozzle 16, whereby a film containing nitrogen and indium may be formed on the base 14.

To the charge transport layer, a dopant may be added in order to control the conduction type thereof.

As methods for doping the dopant during film formation, $SiH_3$ and $SnH_4$ may be used for an n type and biscyclopentadienyl magnesium, dimethylcalcium, dimethylstrontium, etc., may be used for a p type, in the form of gas. In order to introduce dopant elements into the charge transport layer, a known method, such as a thermal diffusion method or an ion implantation method may be employed.

Specifically, by introducing gas containing at least one dopant element into the film forming chamber 10 through the gas introduction pipe 15 and the shower nozzle 16, a conductive charge transport layer of, for example, an n type or p type, is obtained.

In the film forming device described with reference to FIGS. 4A and B and FIG. 5, active nitrogen or active hydrogen formed by discharge energy may be independently controlled by providing two or more active devices or gas containing a nitrogen atom and a hydrogen atom, such as $NH_3$, may be used. Furthermore, $H_2$ may be added. Conditions in which active hydrogen is isolated and generated from organic metal compounds may be used.

Thus, on the surface of the base 14, a carbon atom, a gallium atom, a nitrogen atom, a hydrogen atom, etc., are present while being controlled and a hard film (charge transport layer) having a three-dimensional bond may be formed.

The plasma generating device of the film forming device illustrated in FIGS. 4A and 4B and FIG. 5 employs a high frequency oscillation device. However, the device is not limited thereto, a microwave oscillation device or a device of an electro cyclotron resonance system or a Helicon plasma system may be used, for example. In the case of the high frequency oscillation device, an inducible type or a capacity type may be used.

Two or more kinds of the devices may be combined or two or more devices of the same kind may be used. In order to suppress an increase in the temperature of the surface of the base 14 by irradiation of plasma, the high frequency oscillation device is preferable. A device for preventing irradiation of heat may be provided.

When two or more different kinds of plasma generating devices (plasma generating measures) are used, it is preferable to control the devices so as to cause discharge at the same pressure in both the devices. The pressure in a discharge region and the pressure in a film formation region (portion in which the base is disposed) may be made different. The devices may be disposed in series relative to a gas flow formed from a portion where gas is introduced to a portion where the gas is discharged in the film forming device or may be disposed so that each device faces the film forming surface of the base.

For example, when two kinds of the plasma generating devices are disposed in series relative to the gas flow, the devices are utilized as a second plasma generating device that causes discharge in the film forming chamber 10 using the shower nozzle 16 as an electrode utilized in the film forming device illustrated in FIGS. 4A and 4B as an example. In this case, for example, a high frequency voltage is applied to the shower nozzle 16 through the gas introduction pipe 15, and discharge is made to occur in the film forming chamber 10 using the shower nozzle 16 as an electrode. Or, instead of utilizing the shower nozzle 16 as an electrode, a cylindrical electrode is provided between the base 14 and the flat plate electrode 19 in the film forming chamber 10, and discharge is made to occur in the film forming chamber 10 utilizing the cylindrical electrode.

When two different kinds of plasma generating devices are utilized under the same pressure, e.g., using a microwave oscillation device and a high frequency oscillation device, the excitation energy of excitation species may be largely changed, which is effective for controlling the film quality. The discharge may be performed in the atmospheric pressure (from 70000 Pa to 110000 Pa). When discharge is performed in the atmospheric pressure, it is preferable to use He as a carrier gas.

For the formation of the charge transport layer, a common organic metal vapor phase growth method or a molecular beam epitaxy method may be used other than the method described above. When a film is formed by any of these methods, the use of active nitrogen and/or active hydrogen and/or active oxygen may be effective for lowering temperatures. In this case, examples of a nitrogen material include a gas, such as $N_2$, $NH_3$, $NF_3$, $N_2H_4$, or methyl hydrazine, an evaporated liquid or a substance babbled with a carrier gas. Examples of an oxygen raw material include oxygen, $H_2O$, CO, $CO_2$, NO, and $N_2O$.

The charge transport layer in this exemplary embodiment may be formed by providing the base 14 on the base of the film forming chamber 10, and then introducing a mixed gas containing gases having different compositions.

As the film formation conditions, when discharge is performed by, for example, high frequency discharge, the frequency is preferably in the range of from 10 kHz to 50 MHz in order to perform excellent film formation at low temperatures. The output depends on the size of the base and is preferably in the range of from 0.01 W/cm$^2$ to 0.2 W/cm$^2$ relative to the surface area of the base. The rotation speed of the base is preferably in the range of from 0.1 rpm to 500 rpm.

Single-Layer Photosensitive Layer of Functions Integrated Type

The single-layer photosensitive layer (hereinafter simply referred to as “a function-integrated photosensitive layer”) in which functions are integrated in an example of this exemplary embodiment illustrated in FIG. 10 is a layer containing oxygen (O), gallium (Ga), and zinc (Zn).

Examples of the function-integrated photosensitive layer in this exemplary embodiment includes a layer employing the structure of the charge transport layer described above as it is. Also for the method of forming the function-integrated photosensitive layer, the method of forming the charge transport layer described above may be employed as it is. The base 14 for the formation of the function-integrated photosensitive layer in the photoreceptor illustrated in FIG. 10 is the substrate 1 on which the undercoat layer 5 is formed.

Charge Injection Layer

The charge injection layer in an example of this exemplary embodiment illustrated in FIG. 11 is a layer containing oxygen (O), gallium (Ga), and zinc (Zn).

Examples of the charge injection layer in this exemplary embodiment include a layer employing the structure of the charge transport layer described above as it is. As previously described above, it is preferable that, the content ratio (the ratio of the number of atoms) of zinc (Zn) to gallium (Ga) in the charge injection layer is higher than that in the charge transport layer and the content ratio (the ratio of the number of atoms) of oxygen (O) to gallium (Ga) and zinc (Zn) in the charge injection layer is lower than that in the charge transport layer.

Also for the method of forming the charge injection layer, the method of forming the charge transport layer described above may be employed as it is. The base 14 for the formation of the charge injection layer in the photoreceptor illustrated in FIG. 10 is the substrate 1 on which the undercoat layer 5 and the charge generating layer 2 are formed, The charge generating layer, the undercoat layer, and the substrate (conductive support) are as described in exemplary embodiment A as the charge generating layer, the undercoat layer, and the conductive support, respectively.

Next, a process cartridge and an image forming device in which the electrophotographic photoreceptor according to an exemplary embodiment of the invention is used are described.

<Process Cartridge and Image Forming Device>

A process cartridge and an image forming device in which an electrophotographic photoreceptor according to an exemplary embodiment of the invention are described.

The process cartridge of an exemplary embodiment of the invention is not particularly limited insofar the process cartridge is provided with the electrophotographic photoreceptor according to an exemplary embodiment. Specifically, the process cartridge includes the electrophotographic photoreceptor of an exemplary embodiment of the invention and at least one selected from the group consisting of a charging device, a developing device, and a cleaning device, which are integrated as one unit, and the process cartridge may be detachably attached to the main body of the image forming device.

The image forming device of an exemplary embodiment of the present invention is not particularly limited insofar as the image forming device is provided with the electrophotographic photoreceptor of an exemplary embodiment. Specifically, the image forming device includes the electrophotographic photoreceptor of an exemplary embodiment of the invention, a charging device that charges the surface of the electrophotographic photoreceptor, an exposure device (electrostatic latent image forming device) that forms an electrostatic latent image by exposing the surface of the electrophotographic photoreceptor charged by the charging device, a developing device that develops the electrostatic latent image with a toner containing developer to form a toner image, and a transfer device that transfers the toner image onto a recording medium. The image forming device of this exemplary embodiment of the invention may be a so-called tandem device having plural photoreceptors corresponding to the respective toners of various colors. In this case, it is preferable that all the photoreceptors be the electrophotographic photoreceptor of an exemplary embodiment of the present invention. The toner image may be transferred by an intermediate transfer method utilizing an intermediate transfer medium.

The process cartridge or the image forming device of an exemplary embodiment of the present invention is provided with the electrophotographic photoreceptor of an exemplary embodiment of the present invention by which a reduction in sensitivity may be suppressed. Therefore, even when used over a long period of time, the occurrence of flaws on the surface of the photoreceptor or abrasion thereof may be suppressed, and image unevenness may also be suppressed.

Figure 6:
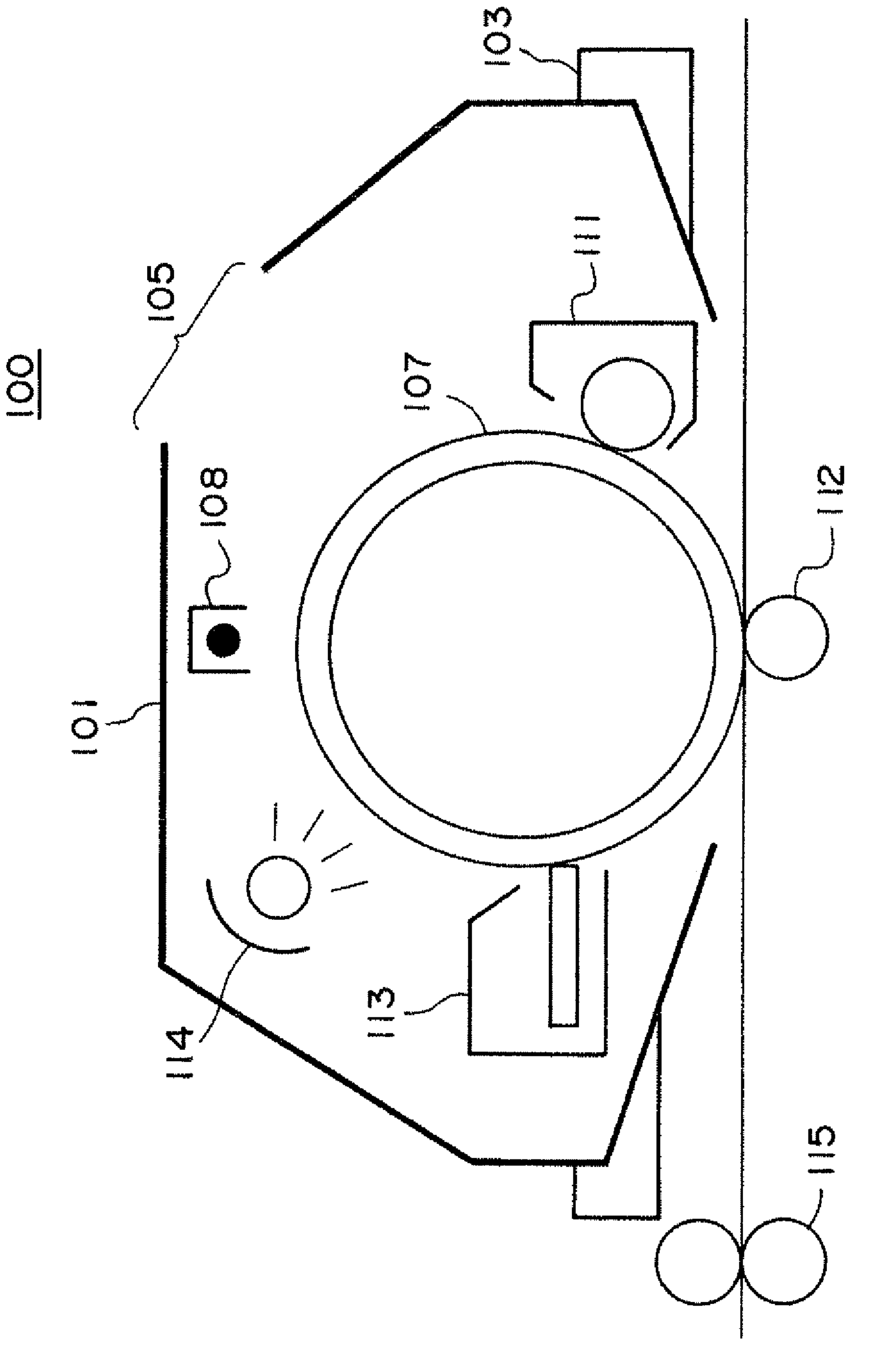
FIG. 6 is a schematic view illustrating an example of the structure of a process cartridge having the electrophotographic photoreceptor according to an exemplary embodiment of the present invention.

FIG. 6 schematically illustrates an example of the basic structure of the process cartridge according to an exemplary embodiment of the invention. A process cartridge 100 illustrated in FIG. 6 includes a charging device 108, a developing device 111, a cleaning device 113, an opening for exposure 105, and an eraser 114, with the electrophotographic photoreceptor 107, and they are combined and integrated using a case 101 and an attachment rail 103. The process cartridge 100 is configured to be detachably attached to the main body of the image forming device including a transfer device 112, a fixing device 115, and additional component(s) that are not illustrated, and is used in an image forming device with the main body of the image forming device.

Figure 7:
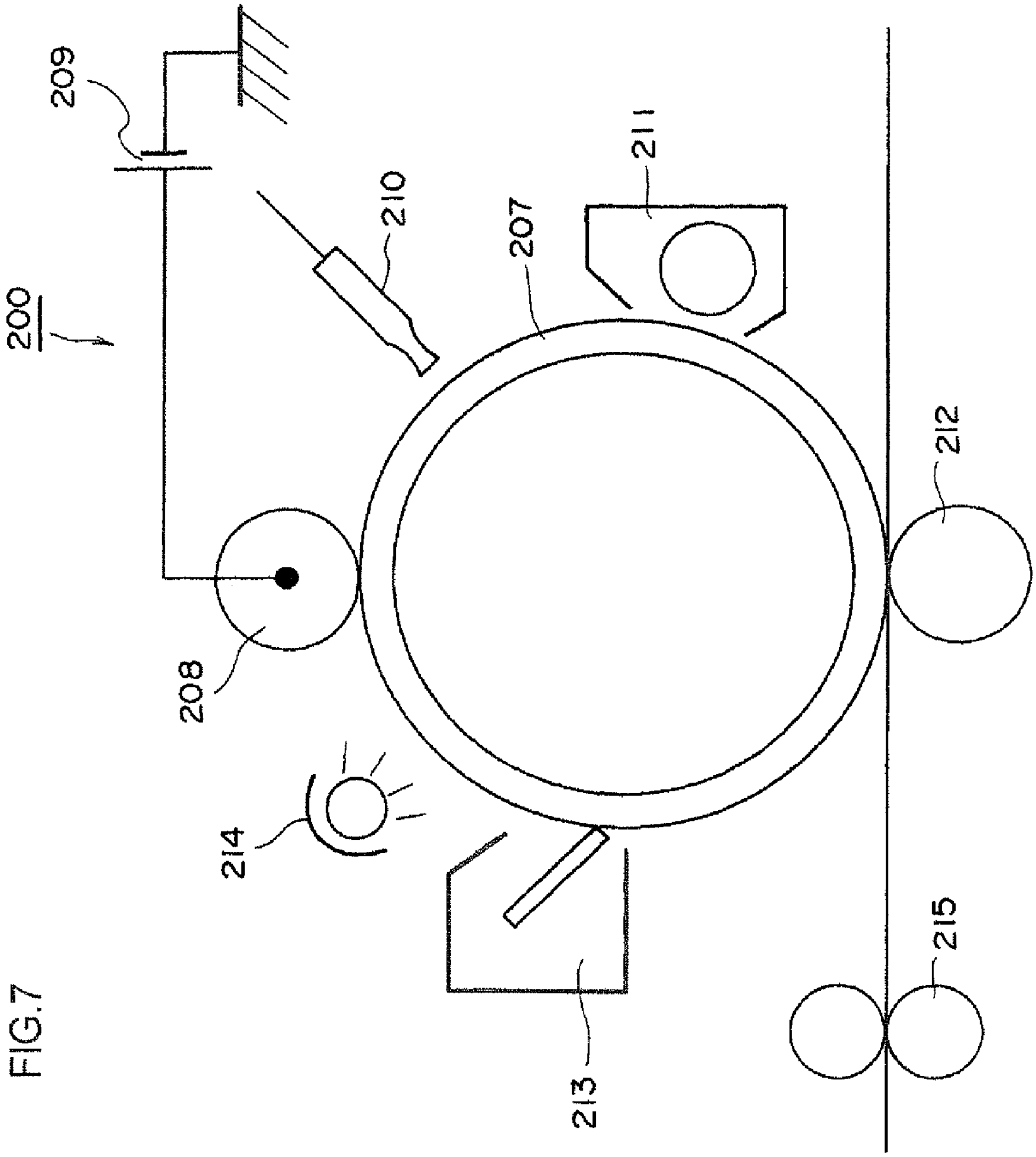
FIG. 7 is a schematic view illustrating an example of the structure of an image forming device having the electrophotographic photoreceptor according to an exemplary embodiment of the present invention.

FIG. 7 schematically illustrates an example of the basic structure of the image forming device of an exemplary embodiment of the invention. An image forming device 200 illustrated in FIG. 7 includes an electrophotographic photoreceptor 207, a charging device 208 that charges the electrophotographic photoreceptor 207 by a contact method, a power source 209 connected to the charging device 208, an exposure device 210 that exposes the electrophotographic photoreceptor 207 charged by the charging member 208, a developing device 211 that develops a portion exposed by the exposure device 210, a transfer device 212 that transfers the image developed on the electrophotographic photoreceptor 207 by the developing device 211, a cleaning device 213 that removes a toner remaining on the surface of the electrophotographic photoreceptor 207 after transferring, an eraser 214 for removing residual charges on the surface of the electrophotographic photoreceptor, and a fixing device 215 that fixes a toner image transferred onto a recording medium.

The cleaning device 213 in the process cartridge and the image forming device of exemplary embodiments of the invention is not particularly limited and may include a cleaning blade. The cleaning blade may be more likely to cause flaws on the photoreceptor surface and to accelerate abrasion compared with other cleaning devices, such as a brush. However, in the process cartridge or the image forming device of exemplary embodiments of the invention, since the electrophotographic photoreceptor of an exemplary embodiment of the invention is used, the occurrence of flaws or abrasion on the surface of the photoreceptor may be suppressed even when used over a long period of time.

EXAMPLES

Hereinafter, the invention is described specifically with reference to Examples, but is not limited to these Examples.

Example 1

An organic photoreceptor in which an undercoat layer (a charge injection inhibition layer), a charge generating layer, and a charge transport layer are successively formed on an aluminum support (outer diameter: 84 mm) according to the following processes is produced.

An undercoat layer serving as the charge injection inhibition layer is obtained as follows. 20 parts by weight of a zirconium compound (trade name: ORGATIX ZC540, manufactured by Matsumoto Seiyaku Co., Ltd.), 2.5 parts by weight of a silane compound (trade name: A1100, manufactured by Nippon Unicar Co., Ltd.), 10 parts by weight of polyvinyl butyral resin (trade name: S-LEC BM-S, manufactured by Sekisui Chemical Co., Ltd.), and 45 parts by weight of butanol are mixed while stirring, the mixture is applied to the surface of the support, and the resulting coating is dried by heating at 150° C. for 10 minutes, so that the undercoat layer having a thickness is 1.0 μm or lower is obtained.

Next, 1 part by weight of chlorogallium phthalocyanine as a charge generating material is mixed with 1 part by weight of polyvinyl butyral (trade name: S-LEC BM-S, manufactured by Sekisui Chemical Co., Ltd.) and 100 parts by weight of n-butyl acetate, and the mixture is dispersed for 1 hour by a paint shaker with glass beads, thereby obtaining a dispersion liquid for forming a charge generating layer. The dispersion liquid is applied onto the undercoat layer by dip coating, and dried at 100° C. for 10 minutes, thereby obtaining a charge generating layer having a thickness of 0.15 μm.

Next, 2 parts by weight of a compound represented by Formula (1) and 3 parts by weight of a high molecular weight compound (viscosity average molecular weight 39000) including a structure unit represented by Formula (2) are dissolved in 20 parts by weight of chlorobenzene, thereby obtaining a coating liquid for forming a charge transport layer.

Formula (1)

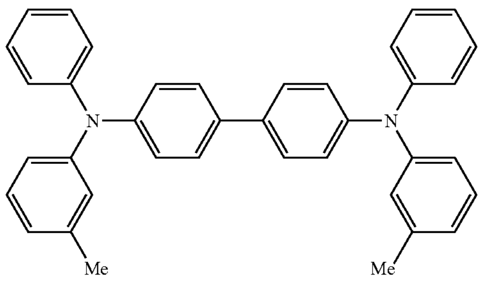

-continued

Formula (2)

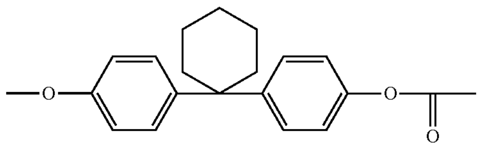

The coating liquid is applied onto the charge generating layer by dip coating, and heated at 110° C. for 40 minutes, thereby obtaining a charge transport layer having a thickness of 20 μm.

The photoreceptor obtained as described above is attached to the base support member 13 in the device illustrated in FIG. 4A and the inside of the chamber 10 is evacuated through the exhaust vent 11.

20 sccm of helium-diluted oxygen gas and 100 sccm of He gas are individually introduced into the electrode portion 19 having a diameter of 50 mm from the gas introduction pipe 20. Then, a radiowave of 13.56 MHz is adjusted to an output of 50 W through the high-frequency power supply 18 and the matching circuit and matched with a tuner to cause discharge. The reflected wave at this time is 0 W.

A mixed gas containing 0.2 sccm of trimethylgallium using hydrogen as a carrier and a gas of 0.07 sccm of dimethyl zinc are mixed, and introduced into a remote plasma from the nozzle 16. The reaction pressure of trimethylgallium and dimethyl zinc measured by a baratron vacuum gauge at this time is 40 Pa.

The base (photoreceptor) is not heated. To the surface of the organic photoreceptor, a temperature measuring sticker (TEMP-PLATE P/N101, manufactured by Wahl) is attached so as to measure the surface temperature.

The film formation is performed for 60 minutes under this state, thereby forming an amorphous film having a thickness of 0.4 μm and containing hydrogen, gallium, zinc, and oxygen, on the organic photoreceptor. The temperature measured by the temperature measuring sticker is 45° C.

The elemental analysis by RBS and HFS of the films simultaneously formed on an Si substrate shows that the ratio of Ga and Zn is 1:0.38 (ratio of the number of atoms) and the ratio of the number of atoms of oxygen to the sum of the number of atoms of Ga and Zn is 1.24. 18% by atom of hydrogen is contained relative to the total number of atoms of Ga, Zn, O, and H.

The contact angle with pure water is 80°.

The film is transparent and the film surface is not damaged even when rubbed by stainless steel.

Dots or lines are not observed in a diffraction image of RHEED (reflective high energy electron diffraction), which shows that the film is amorphous.

In order to measure the film resistance, onto an aluminum supporting substrate having an outside diameter of 84mm, an amorphous film including hydrogen, gallium, zinc and oxygen is directly formed under substantially the same conditions as those of the formation of the amorphous film on the organic photoreceptor, and an Au-deposited electrode having a diameter of 2 mm is formed on the amorphous film. A copper wire, which serves as a lead wire, is adhered with a silver paste to the Au-deposited electrode and to an Al portion of the substrate. The volume resistivity is determined from the voltage/current value in the electric field of $10^5$ (V/cm). The resistance is $8\times10^{10}$ Ωcm and the charging property is 5 v/μm. The volume resistivity is a value measured by a semiconductor parameter analyzer AGILENT 4155C (trade name, manufactured by Agilent Technologies, Inc.) and the charging property is a value measured by a surface potentiometer Model 334 and a Model 555P-1 probe (trade name, manufactured by TREC, Inc.).

The measurement is performed by stylus level difference measurement. As a sample substrate, an Si wafer having a thickness of 400 μm cut into 5×10 mm is used. The level difference between a non-film deposition portion and a film deposition portion formed on the photoreceptor surface with a polyimide adhesive tape for fixation is measured with a SURFCOM 550A (trade name) manufactured by Tokyo Seimitsu Co., Ltd.

The photoreceptor above is mounted on a "DOCUCENTRE COLOR 500" manufactured by Fuji Xerox Co., Ltd., and then subjected to image evaluation at a high humidity and high temperature environment (temperature: 28° C., humidity: 80% RH).

White Line

Images after 20000 halftone images (30% image density) are printed are evaluated for white line defects on images. The evaluation criteria are as follows.

A: No white line image defects are observed.

B: Although white line image defects that are considered to result from flaws of a photoreceptor are slightly observed, the flaws are within a tolerable level for practical application.

C: A large number of white line image defects that are considered to result from flaws of a photoreceptor are observed, and the flaws exceed a tolerable level for practical application.

Image Density

Images obtained after 1000 sheets are printed, and then 100 solid images having an area coverage of 100% are continuously printed are evaluated for the image density in accordance with the following evaluation criteria.

—Evaluation Criteria—

A: A reduction in image density is not observed even after 100 images are printed.

B: Although a reduction in image density is slightly observed after images of more than 90 and less than 100 are printed, but the reduction is within a tolerable level for practical application.

C: Although a reduction in image density is slightly observed after images of more than 70 and 90 or less are printed, but the reduction is within a tolerable level for practical application.

D: When 70 or less images are printed, the image density reduction is observed at a glance, and the reduction exceeds a tolerable level for practical application.

Image Blurring

With respect to image blurring, after 20000 sheets are printed in the image quality evaluation above, only a part of the photoreceptor surface is wiped with water for removing discharge products that are water soluble.

Thereafter, halftone images (30% image density) are printed, and the presence of density differences that correspond to portions that are wiped with water and portions that are not wiped with water of the halftone images is visually checked. Then, the image blurring is evaluated in accordance with the following evaluation criteria.

—Evaluation Criteria—

A: The presence of density differences is not observed.

B: Although the presence of density differences is slightly observed, the density difference is within a tolerable level for practical application.

C: The presence of density differences is observed at a glance, and the density difference exceeds a tolerable level for practical application.

Flaw

The photoreceptor surface after the 20000-sheet print test in the image evaluation above is performed is visually observed, and the presence of surface flaw is analyzed.

The evaluation criteria are as follows.

—Evaluation Criteria—

A: A surface flaw is not observed.

B: Although a surface flaw is slightly observed, the flaw is within a tolerable level for practical application.

C: A surface flaw is observed at a glance, and the flaw exceeds a tolerable level for practical application.

<Increase in Residual Potential when Repeatedly Used>

Before the 20000-sheet print test in the image evaluation above, an electrophotographic photoreceptor having a protective layer is first measured for the residual potential A at a wavelength of 780 nm.

Next, after the 20000-sheet print test in the image evaluation above, the electrophotographic photoreceptor having a protective layer is measured for the residual potential A at a wavelength of 780 nm.

Based on these results, an increase in the residual potential (changed electric potential V) when repeatedly used is evaluated in accordance with the following evaluation criteria.

Comprehensive Image Evaluation:

A: All of the items of the white line, image density, and image blurring are evaluated as A.

B: 1 to 2 items above are evaluated as B.

C: 3 items above are evaluated as B.

D: 1 item above is evaluated as C.

In the print evaluation above in Example 1, the evaluation result is A.

The photoreceptor after the print evaluation has no surface flaw and maintains the initial slipping properties.

Example 2

A surface layer of a gallium oxide film having a thickness of 0.5 μm and containing hydrogen and zinc is formed in a manner similar to those in Example 1, using an organic photoreceptor in which the undercoat layer, the charge generating layer and the charge transport layer have been produced in substantially the same procedure as in Example 1. A mixed gas of 0.15 seem of trimethylgallium and 0.14 seem of dimethyl zinc using hydrogen as a carrier is introduced into a remote plasma through the gas introduction pipe 15. The plasma is adjusted through the slit-shaped diffusion portion 17. The reaction pressure measured by a baratron vacuum gauge at this time is 40 Pa.

The elemental analysis by RBS and HFS of the film simultaneously formed on an Si substrate shows that, in the film formed on the substrate, the ratio of Ga and Zn is 1:0.45 (ratio of the number of atoms) and the number of atoms of oxygen to the sum of the number of atoms of Ga and Zn is 1.20.

19% by atom of hydrogen is contained relative to the total number of atoms of Ga, Zn, O, and H.

The contact angle with pure water is 80°.

The film is transparent and the film surface is not damaged even when rubbed by stainless steel.

Dots or lines are not observed in a diffraction image of RHEED (reflective high energy electron diffraction), which shows that the film is amorphous.

In order to measure the film resistance, onto an aluminum supporting substrate having an outside diameter of 84 mm, an amorphous film including hydrogen, gallium, zinc and oxygen is directly formed under substantially the same conditions as those of the formation of the amorphous film on the organic photoreceptor, and an Au-deposited electrode having a diameter of 2 mm is formed on the amorphous film. A copper wire, which serves as a lead wire, is adhered with a silver paste to the Au-deposited electrode and to an Al portion of the substrate. The volume resistivity is determined from the voltage/current value in the electric field of $10^5$ (V/cm). The resistance is $5\times10^{11}$ Ωcm and the charging property is 20 V.

The film is transparent and the film surface is not damaged by a stainless steel. Dots or lines are not observed in a diffraction image of RHEED, which shows that the film is amorphous.

The charging property change is small, the change in residual potential after the film is irradiated with light is 20 V or lower, and influences to the sensitivity are hardly observed throughout the region from the infrared region to the visible region.

With respect to the film adhesiveness, the film does not separate even using an adhesive tape and, with respect to the surface properties, the surface is flat and the slipping properties are favorable compared with the original organic photoreceptor.

The photoreceptor is mounted on a "DOCUCENTRE COLOR 500" manufactured by Fuji Xerox Co., Ltd, and then subjected to image evaluation at a high humidity and high temperature environment in substantially the same manner as in Example 1. Then, clear images are obtained. The photoreceptor surface after the print evaluation at a high temperature and high humidity environment has no flaw and maintains the initial slipping properties.

Example 3

A surface layer of a zinc-gallium oxide film is formed under substantially the same conditions as in Example 1 using an amorphous silicon photoreceptor of negative charge type having, on an aluminum support, an n-type $Si_3N_1$ charge injection inhibition layer having a thickness of 3 μm, an i-type amorphous silicon photoconduction layer having a thickness of 20 μm, and a p-type $Si_2C_1$ charge injection inhibition surface layer having a thickness of 0.5 and using the device of FIG. 4A.

The film is almost transparent and the film surface is not damaged with a stainless steel.

Dots or lines are not observed in a diffraction image of RHEED, which shows that the film is amorphous.

The charging property does not change, the change in residual potential after the film is irradiated with light is 30 V or lower, and influences to the sensitivity are not observed throughout the region from the infrared region to the visible region.

With respect to the adhesiveness, the film does not separate even using an adhesive tape and, with respect to the surface properties, the surface is flat and the slipping properties are favorable compared with the original amorphous silicon photoreceptor.

The photoreceptor is mounted on a "DOCUCENTRE COLOR 500" manufactured by Fuji Xerox Co., Ltd while changing the conditions, and then subjected to image evaluation at a high humidity and high temperature environment. Then, clear images are obtained. The photoreceptor surface after the print evaluation at a high temperature and high humidity environment has no flaw and maintains the initial slipping properties.

Example 4

A surface layer of a gallium oxide film having a thickness of 0.5 μm and containing hydrogen and zinc is formed in a manner similar to those in Example 1, using an organic photoreceptor in which the undercoat layer, the charge generating layer and the charge transport layer have been produced in substantially the same procedure as in Example 1.

In the process, the surface layer of a gallium oxide film is produced using the device illustrated in FIG. 4A, which is substantially the same as in Example 1, under substantially the same conditions as in Example 1, except for introducing a mixed gas of 0.2 seem of trimethylgallium and 0.02 seem of dimethyl zinc using hydrogen as a carrier into a remote plasma through the gas introduction pipe 15. The plasma is adjusted through the slit-shaped diffusion portion 17. The reaction pressure measured by a baratron vacuum gauge at this time is 40 Pa.

Example 5

A surface layer of a gallium oxide film having a thickness of 0.5 μm and containing hydrogen and zinc is formed in a manner similar to those of Example 1, using an organic photoreceptor in which the undercoat layer, the charge generating layer, and the charge transport layer have been produced in substantially the same procedure as in Example 1.

In the process, the surface layer of a gallium oxide film is produced using the device illustrated in FIG. 4A, which is substantially the same as in Example 1, under substantially the same conditions as in Example 1, except for introducing a mixed gas of 0.15 seem of trimethylgallium and 0.2 sccm of dimethyl zinc using hydrogen as a carrier into a remote plasma through the gas introduction pipe 15. The plasma is adjusted through the slit-shaped diffusion portion 17. The reaction pressure measured by a baratron vacuum gauge at this time is 40 Pa.

Comparative Example 1

A surface layer of a gallium oxide film having a thickness of 0.5 μm and containing hydrogen is formed in a manner similar to those in Example 1, using an organic photoreceptor in which the undercoat layer, the charge generating layer, and the charge transport layer have been produced in substantially the same procedure as in Example 1.

In the process, the surface layer of a gallium oxide film is produced using the device illustrated in FIG. 4A, which is substantially the same as in Example 1, under substantially the same conditions as in Example 1, except for introducing a mixed gas with 0.3 seem of trimethylgallium using hydrogen as a carrier into a remote plasma through the gas introduction pipe 15. The plasma is adjusted through the slit-shaped diffusion portion 17. The reaction pressure measured by a baratron vacuum gauge at this time is 40 Pa.

Comparative Example 2

A surface layer of a gallium oxide film having a thickness of 0.5 μm and containing hydrogen and zinc is formed in a manner similar to those in Example 1, using an organic photoreceptor in which the charge transport layer has been produced in substantially the same procedure as in Example 1. In the process, the surface layer of a gallium oxide film is produced using the device illustrated in FIG. 4A, which is substantially the same as in Example 1, under substantially the same conditions as in Example 1, except for introducing a mixed gas with 0.05 seem of trimethylgallium and 0.4 seem of dimethyl zinc using hydrogen as a carrier into a remote plasma through the gas introduction pipe 15. The plasma is adjusted through the slit-shaped diffusion portion 17. The reaction pressure measured by a baratron vacuum gauge at this time is 40 Pa.

The composition ratios and the evaluation results of oxide materials formed in the Examples 1 to 5 and the Comparative Examples 1 and 2 are shown in Table 1.

100 sccm of He gas are introduced into the flat plate electrode 19 having a diameter of 50 mm from the gas introduction pipe 20, a 13.56-MHz radiofrequency wave is set to the output of 50 W through the high frequency power supply portion 18 and matched by a tuner, and then discharge is performed. The reflected wave at this time is 0 W.

TABLE 1

| | Example 1 | Example 2 | Example 3 | Example 4 | Example 5 | Comparative Example 1 | Comparative Example 2 |
|---|---|---|---|---|---|---|---|
| Layer | Surface layer | Surface layer | Surface layer | Surface layer | Surface layer | Surface layer | Surface layer |
| Zn/Ga | 0.38 | 0.45 | 0.38 | 0.01 | 0.6 | 0 | 0.7 |
| O/(Ga + Zn) | 1.24 | 1.20 | 1.24 | 1.60 | 1.10 | 1.45 | 0.90 |
| H/(Ga + Zn + O + H) | 18% | 19% | 18% | 16% | 19% | 16% | 15% |
| Zn/(Ga + Zn + O) | 0.11 | 0.13 | 0.11 | 0.004 | 0.18 | 0 | 0.22 |
| Volume resistivity (Ωcm) | $8 \times 10^{10}$ | $5 \times 10^{11}$ | $8 \times 10^{10}$ | $5 \times 10^{12}$ | $1 \times 10^{10}$ | $7 \times 10^{12}$ | $2 \times 10^{8}$ |
| Changes in residual potential when repeatedly used (ΔV(V)) | 20 | 20 | 30 | 50 | 10 | 100 | 0 |
| Print evaluation | A | A | A | B | B | C | D |
| Presence of flaw after printing | None | None | None | None | None | None | Present |
| Light transmittance | 90% | 80% | 90% | 92% | 60% | 95% | 30% |

Comparative Example 1B

By the following method, an organic photoreceptor on which the undercoat layer, the charge generating layer, and the charge transport layer are formed on an aluminum substrate is produced.

—Formation of Undercoat Layer—

20 parts by weight of a zirconium compound (trade name: ORGATIX ZC540, manufactured by Matsumoto Seiyaku Co., Ltd), 2.5 parts by weight of a silane compound (trade name: A1100, manufactured by Nippon Unicar Co., Ltd.), 10 parts by weight of polyvinyl butyral resin (trade name: S-LEC BM-S, manufactured by Sekisui Chemical Co., Ltd.), and 45 parts by weight of butanol are mixed while stirring to prepare an coating liquid for forming an undercoat layer. Then, the coating liquid for forming an undercoat layer is applied to the aluminum substrate, and the coating is heated and dried at 150° C. for 10 minutes, thereby obtaining a 1.0 μm undercoat layer.

—Formation of Charge Generating Layer—

Next, 1 part of chlorogallium phthalocyanine is mixed with 1 part of polyvinylbutyral (trade name: S-LEC BM-S, manufactured by Sekisui Chemical Co., Ltd.), and 100 parts by weight of n-butyl acetate as a charge generating material, and the mixture is dispersed together with glass beads for 1 hour with a paint shaker, thereby obtaining a coating liquid for forming a charge generating layer. The coating liquid for forming a charge generating layer is applied onto the undercoat layer by an immersing method, and dried at 100° C. for 10 minutes, thereby obtaining a 0.15 μm charge generating layer.

—Formation of Charge Transport Layer—

The aluminum substrate on which the undercoat layer and the charge generating layer are formed is placed on the base support member 13 illustrated in FIGS. 4A and 4B, and the inside of the film forming chamber 10 is evacuated through the exhaust vent 11. 20 sccm of He diluted oxygen gas and A mixed gas of 4 sccm trimethyl gallium using hydrogen as a career is introduced into a remote plasma from the gas introduction pipe 15. The reaction pressure measured by a baratron vacuum gauge at this time is 40 Pa.

In this case, the substrate is not heated. To the surface of the aluminum substrate on which the undercoat layer and the charge generating layer are formed, a surface temperature measurement sticker (TEMP-PLATE P/N101, manufactured by Wahl) is adhered in order to measure the surface temperature of the aluminum substrate. In this state, a film is formed for 120 minutes, thereby forming a 10 μm thick amorphous gallium oxide film (charge transport layer) containing gallium (Ga), oxygen (O), and hydrogen (H). The temperature measured by the temperature measurement sticker is 45° C.

—Physical Properties—

A charge transport layer sample for elemental analysis is formed on an Si substrate according to the method described above, and the RBS and HFS elemental analysis is performed with the sample. Then, the ratio of the number of atoms of gallium and oxygen (O/Ga) is 1.45. Hydrogen (H) is contained in the film in a proportion of 15% by atom relative to the total number of atoms of gallium (Ga), oxygen (O), and hydrogen (H). The contact angle with pure water is 80°. The sample film is transparent and the surface of the sample film is not damaged with stainless steel. In the RHEED diffraction image, dots or lines are not observed and it is confirmed that the film is amorphous.

In order to measure the film resistance, onto an aluminum supporting substrate having an outside diameter of 84 mm, an amorphous film including hydrogen, gallium, zinc and oxygen is directly formed under substantially the same conditions as those of the formation of the amorphous film on the organic photoreceptor, and an Au-deposited electrode having a diameter of 2 mm is formed on the amorphous film. A copper wire, which serves as a lead wire, is adhered with a silver paste to the Au-deposited electrode and to an Al portion of the substrate. Then, the volume resistivity is determined from the voltage current value at an electric field of $10^5$ (V/cm). The resistance is $8\times10^{14}$ Ωcm and the charging property is 30 v/μm.

The photoreceptor is positively charged by a scorotron and exposed at a wavelength of 780 nm. Then, the charge potential is 400 V, the optical attenuation is not observed, and the photoreceptor does not operate as an electrophotographic photoreceptor.

Example 1B

—Formation of Undercoat Layer and Charge Generating Layer—

An undercoat layer and a charge generating layer are formed on an aluminum substrate according to the method described in Comparative Example 1B.

—Formation of Charge Transport Layer—

To the aluminum substrate on which the undercoat layer and the charge generating layer are formed, 1000 sccm of nitrogen gas and $H_2$ gas is introduced into the flat plate electrode 19 from the gas introduction pipe 20 at a mixing ratio (weight ratio) of 3:1 using the device illustrated in FIGS. 4A and 4B, a high frequency power is set to 100W and then matched by a tuner, and then discharge is performed. The reflected wave at this time is 0 W.

A mixed gas of 4 sccm trimethyl gallium using hydrogen as a career and 0.03 sccm dimethyl zinc gas are mixed and introduced into a remote plasma from the gas introduction pipe 15. The reaction pressure of the trimethyl gallium gas and the dimethyl zinc gas measured by a baratron vacuum gauge at this time is 40 Pa.

In this case, the substrate is not heated. To the surface of the aluminum substrate on which the undercoat layer and the charge generating layer are formed, a surface temperature measurement sticker (TEMP-PLATE P/N101, manufactured by Wahl) is adhered in order to measure the surface temperature of the aluminum substrate. In this state, a film is formed for 120 minutes, thereby forming a 10 μm thick amorphous gallium oxide film (charge transport layer) containing gallium (Ga) and oxygen (O), and containing hydrogen (H).

—Physical Properties—

A charge transport layer sample for elemental analysis is formed on an Si substrate according to the method described above, and the RBS and HFS elemental analysis is performed in the sample. Then, the ratio of the number of atoms of gallium (Ga) and zinc (Zn) is 1:0.2. The ratio of the number of atoms of oxygen (O) to the total of the elements of gallium (Ga) and zinc (Zn) (O/(Ga+Zn)) is 1.20. Hydrogen (H) is contained in the film in a proportion of 19% by atom relative to the total number of atoms of gallium (Ga), zinc (Zn), oxygen (O), and hydrogen (H). The contact angle with pure water is 80°. The sample film is transparent and the surface of the sample film is not damaged with stainless steel. In the RHEED diffraction image, dots or lines are not observed and it is confirmed that the film is amorphous.

In order to measure the film resistance, onto an aluminum supporting substrate having an outside diameter of 84 mm, an amorphous film including hydrogen, gallium, zinc and oxygen is directly formed under substantially the same conditions as those of the formation of the amorphous film on the organic photoreceptor, and an Au-deposited electrode having a diameter of 2 mm is formed on the amorphous film. A copper wire, which serves as a lead wire, is adhered with a silver paste to the Au-deposited electrode and to an Al portion of the substrate. Then, the volume resistivity is determined from the voltage current value at an electric field of $10^5$ (V/cm). The resistance is $5\times10^{13}$ Ωcm and the chargeability is 20 V/μm.

The photoreceptor is positively charged by a scorotron and exposed at 780 nm. Then, the charge potential decreases from 400 V to 50 V. The photoreceptor is stable against repetition of charging and erasing.

Example 2B

A photoreceptor is produced according to the method described in Example 1B, except that the charge transport layer is formed by the following method in Example 1B.

—Formation of Charge Transport Layer—

A charge transport layer containing gallium (Ga), oxygen (O), and zinc (Zn) and further containing hydrogen (H) is formed according to the method described in Example 1B, except for changing the introduction amount of trimethyl gallium gas using hydrogen as a career and the introduction amount of dimethyl zinc gas in the formation of the charge transport layer of Example 1B, thereby forming a layer having the following physical properties.

—Physical Properties—

A charge transport layer sample for elemental analysis is formed on an Si substrate according to the method described above, and the RBS and HFS elemental analysis is performed in the sample. Then, the ratio of the number of atoms of gallium (Ga) and zinc (Zn) is 1:0.1. The ratio of the number of atoms of oxygen (O) to the total of the elements of gallium (Ga) and zinc (Zn) (O/(Ga+Zn)) is 1.20. Hydrogen (H) is contained in the film in a proportion of 18% by atom relative to the total number of atoms of gallium (Ga), zinc (Zn), oxygen (O), and hydrogen (H). The contact angle with pure water is 85°. The sample film is transparent and the surface of the sample film is not damaged with stainless steel. In the RHEED diffraction image, dots or lines are not observed and the film is confirmed to be amorphous.

Example 3B

—Formation of Undercoat Layer and Charge Generating Layer—

By the method described in Comparative Example 1B, the undercoat layer and the charge generating layer are formed on the aluminum substrate.

—Formation of Charge Injection Layer—

A charge injection layer containing gallium (Ga), oxygen (O), and zinc (Zn) and further containing hydrogen (H) is formed according to the formation method of the charge transport layer described in Example 1B, except for changing the introduction amount of trimethyl gallium gas using hydrogen as a career and the introduction amount of dimethyl zinc gas in the formation of the charge transport layer of Example 1B, thereby forming a layer having the following physical properties.

—Physical Properties—

A charge injection layer sample for elemental analysis is formed on an Si substrate according to the method described above, and the RBS and HFS elemental analysis is performed in the sample. Then, the ratio of the number of atoms of gallium (Ga) and zinc (Zn) is 1:0.25. The ratio of the number of atoms of oxygen (O) to the total of the elements of gallium (Ga) and zinc (Zn) (O/(Ga+Zn)) is 1.20. Hydrogen (H) is contained in the film in a proportion of 17% by atom relative to the total number of atoms of gallium (Ga), zinc (Zn), oxygen (O), and hydrogen (H).

—Formation of Charge Transport Layer—

By the method described in Example 1B, the charge transport layer is formed on the charge injection layer.

Example 4B

A photoreceptor is produced by the method described in Example 3B, except that the charge injection layer is formed by the following method in Example 3B.

—Formation of Charge Injection Layer—

A charge injection layer containing gallium (Ga), oxygen (O), and zinc (Zn) and further containing hydrogen (H) is formed according to the formation method of the charge transport layer described in Example 1, except for changing the introduction amount of trimethyl gallium gas using hydrogen as a career and the introduction amount of dimethyl zinc gas in the formation of the charge transport layer of Example 1, thereby forming a layer having the following physical properties.

—Physical Properties—

A charge injection layer sample for elemental analysis is formed on an Si substrate according to the method described above, and the RBS and HFS elemental analysis is performed in the sample. Then, the ratio of the number of atoms of gallium (Ga) and zinc (Zn) is 1:0.15. The ratio of the number of atoms of oxygen (O) to the total of the elements of gallium (Ga) and zinc (Zn) (O/(Ga+Zn)) is 1.25. Hydrogen (H) is contained in the film in a proportion of 18% by atom relative to the total number of atoms of gallium (Ga), zinc (Zn), oxygen (O), and hydrogen (H).

Example 5B

A photoreceptor is produced by the method described in Example 3B, except that the charge injection layer is formed by the following method in Example 3B.

—Formation of Charge Injection Layer—

A charge injection layer containing gallium (Ga), oxygen (O), and zinc (Zn) and further containing hydrogen (H) is formed according to the formation method of the charge transport layer described in Example 1B, except for changing the introduction amount of trimethyl gallium gas using hydrogen as a career and the introduction amount of dimethyl zinc gas in the formation of the charge transport layer of Example 1B, thereby forming a layer having the following physical properties.

—Physical Properties—

A charge injection layer sample for elemental analysis is formed on an Si substrate according to the method described above, and the RBS and HFS elemental analysis is performed in the sample. Then, the ratio of the number of atoms of gallium (Ga) and zinc (Zn) is 1:0.2. The ratio of the number of atoms of oxygen (O) to the total of the elements of gallium (Ga) and zinc (Zn) (O/(Ga+Zn)) is 1.0. Hydrogen (H) is contained in the film in a proportion of 19% by atom relative to the total number of atoms of gallium (Ga), zinc (Zn), oxygen (O), and hydrogen (H).

<<Evaluation>>

—Sensitivity—

The evaluation of the optical sensitivity of the photoreceptors obtained in Examples and Comparative examples is performed by positively charging the photoreceptors by a scorotron to 400 V, exposing the same while adjusting the light amount at 780 nm in seven levels using an ND filter, and determining the relationship between the exposure amount and the charge potential. The attenuation Vx ($m^2$/mJ) of the surface potential relative to a given exposure amount is defined as the sensitivity.

—Injection Properties—

The evaluation of the charge injection properties from the charge generating layer to the charge transport layer in the photoreceptors obtained in Examples and Comparative examples is performed by determining the ratio of the quantum efficiency determined from the evaluation of "Sensitivity" above as the injection efficiency based on the quantum efficiency calculated from the sensitivity in the organic photoreceptors having the same charge generating layer on the assumption that the optical absorption in the charge generating layer is 100%.

—Image Quality—

The photoreceptors obtained in Examples 1B to 5B and Comparative Example 1B above are placed on DOCUCENTRE COLOR500 (trade name) manufactured by Fuji Xerox Co., Ltd that is adjusted for positive charging, and then print tests are repeated in a high humidity environment (28° C.80% RH) until 1000 sheets are completed. The occurrence of black dots, white dots, and image blur in the obtained images is evaluated. The images not suffering from the occurrence of black dots, white dots, and image blur is evaluated as "A".

—Flaw—

The photoreceptor surface after the test of the "Image quality" above is observed under an optical microscope, and the presence/absence of flaws is judged. The photoreceptors having no flaws are defined as "A".

TABLE 2

| | Charge transport layer O, Ga, Zn | Charge injection layer O, Ga, Zn | Evaluation: Sensitivity | Injection properties | Image quality | Flaw |
|---|---|---|---|---|---|---|
| Ex. 1B | 1.4:1:0.2 | — | 200 | 90 | A | A |
| Ex. 2B | 1.3:1:0.1 | — | 150 | 80 | A | A |
| Ex. 3B | 1.4:1:0.2 | 1.5:1:0.25 | 210 | 95 | A | A |
| Ex. 4B | 1.4:1:0.2 | 1.43:1:0.15 | 200 | 75 | A | A |
| Ex. 5B | 1.4:1:0.2 | 1.2:1:0.2 | 170 | 90 | A | A |
| Comp. Ex. 1B | O, Ga (1.45:1) | — | 0 | 0 | Unevaluatable | Unevaluatable |

Ex.: "Example"
Comp. Ex: "Comparative Example"

What is claimed is:

1. An oxide material comprising gallium, zinc and oxygen, a ratio of the number of atoms of zinc to the number of atoms of gallium (number of atoms of zinc/number of atoms of gallium) being from about 0.01 to about 0.6 and a ratio of the number of atoms of oxygen to the sum of the number of atoms of gallium and the number of atoms of zinc (number of atoms of oxygen/(number of atoms of gallium +number of atoms of zinc)) being from about 1.0 to about 1.6.

2. The oxide material of claim 1, which is amorphous.

3. The oxide material of claim 1, wherein a content rate of zinc is from about 0.4% by atom to about 25% by atom relative to the sum of the number of atoms of gallium, the number of atoms of zinc and the number of atoms of oxygen.

4. An electrophotographic photoreceptor comprising a layer which includes the oxide material of claim 1.

5. An electrophotographic photoreceptor, comprising:

an inorganic photosensitive layer or a organic photosensitive layer; and a layer that is disposed on the inorganic photosensitive layer or the organic photosensitive layer and includes the oxide material of claim 1.

6. A process cartridge comprising: the electrophotographic photoreceptor of claim 4; and at least one selected from the group consisting of a charging device, a developing device and a cleaning device.

7. An image forming device comprising: the electrophotographic photoreceptor of claim 4; a charging device that charge the electrophotographic photoreceptor; a latent image forming device that forms a latent image on the surface of the charged electrophotographic photoreceptor; a developing device that develops the latent image formed on the surface of the electrophotographic photoreceptor with a developer including a toner to form a toner image; and a transfer device that transfers the toner image formed on the surface of the electrophotographic photoreceptor to a recording medium.

* * * * *